INVENTORS.
BERNARD G. THOMPSON
WILLIAM L. MC DONALD

BY D. Kendall Cooper
ATTORNEY

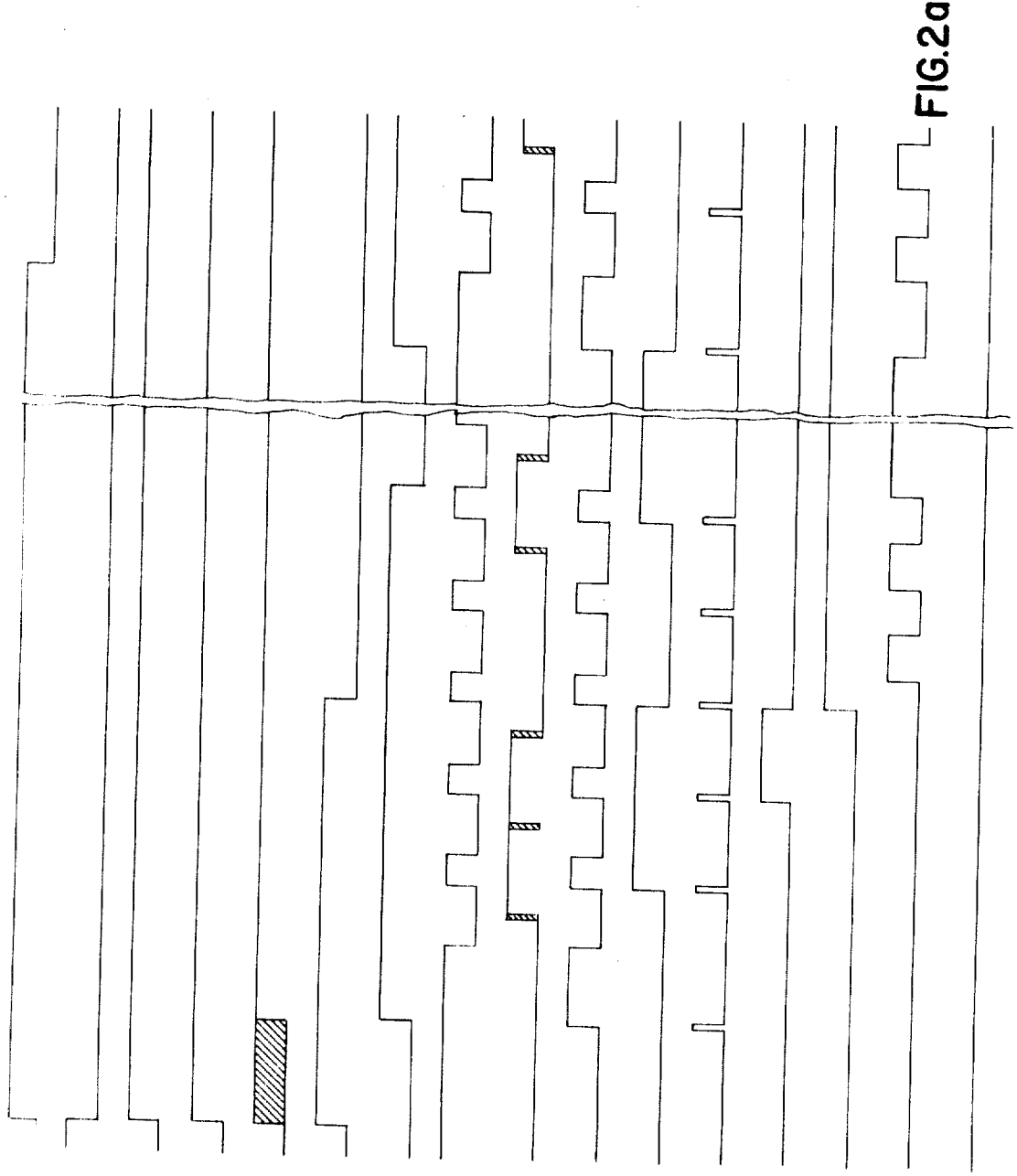

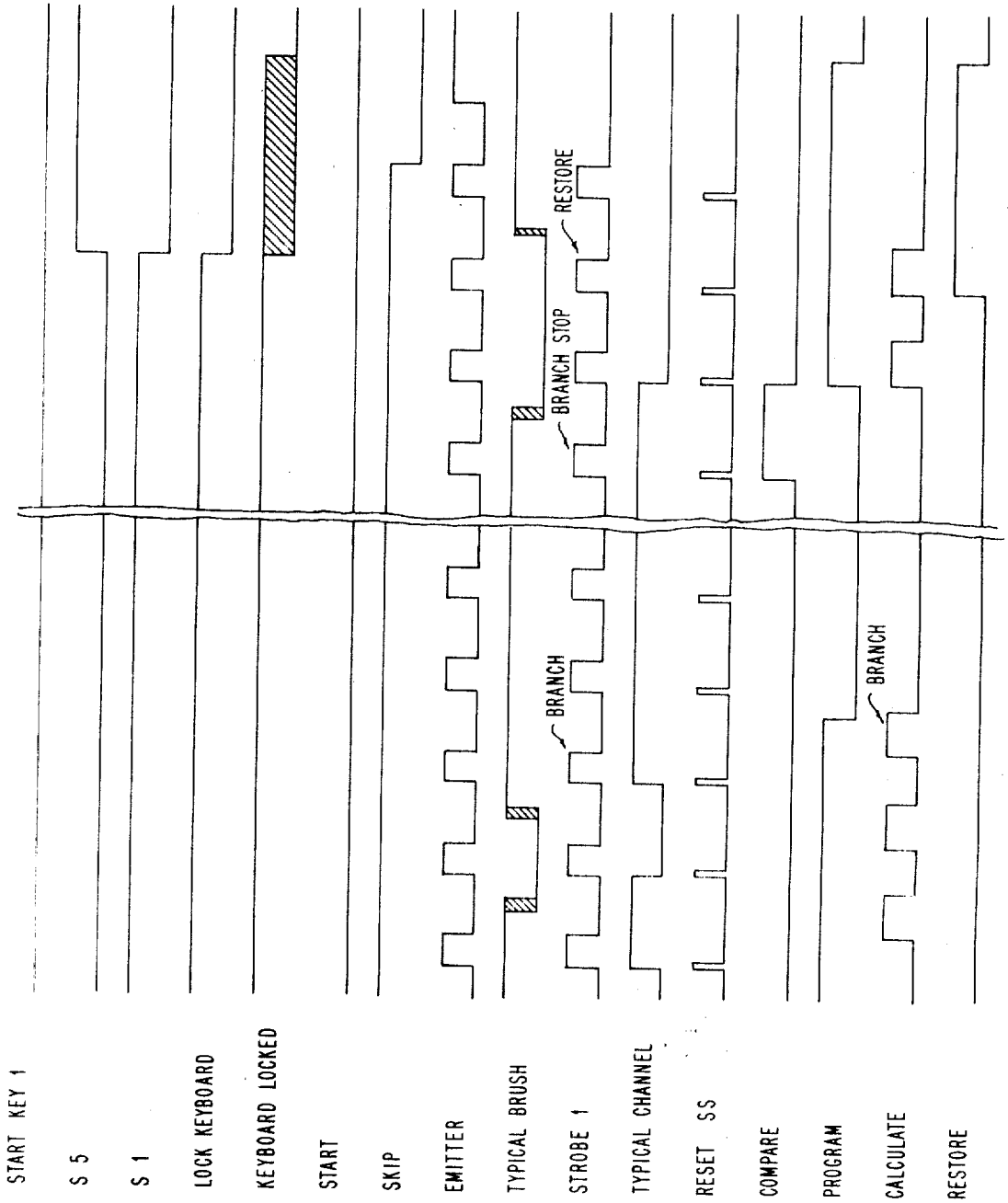

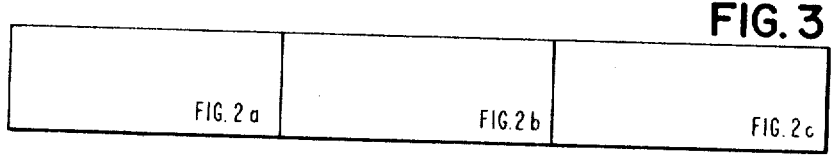
FIG. 3
| FIG. 2a | FIG. 2b | FIG. 2c |
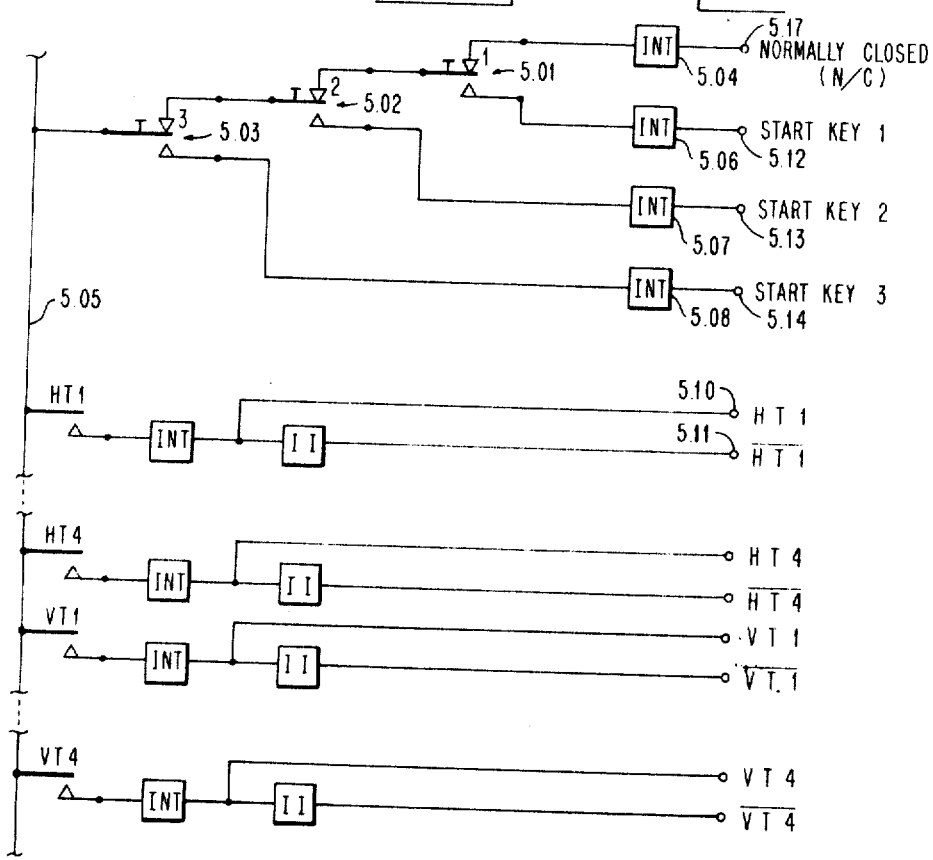
FIG. 4
FIG. 5

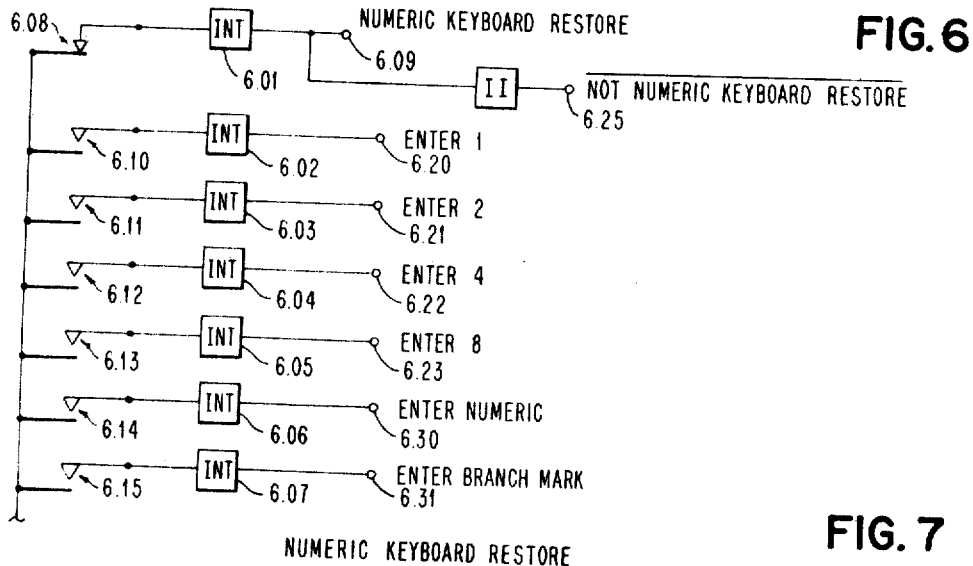
FIG. 6
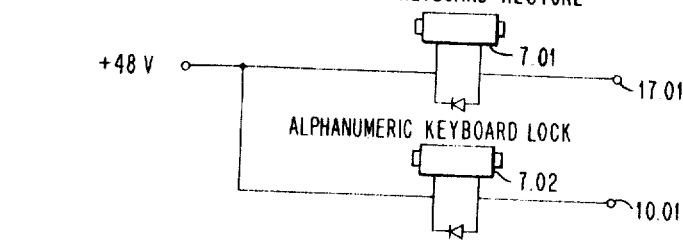
FIG. 7
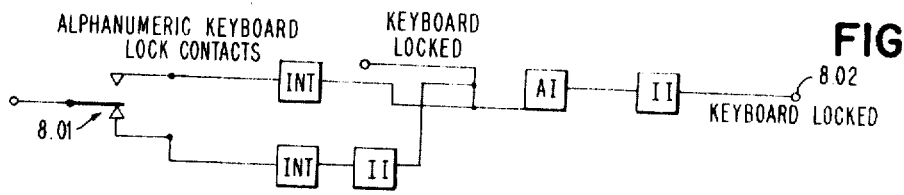
FIG. 8
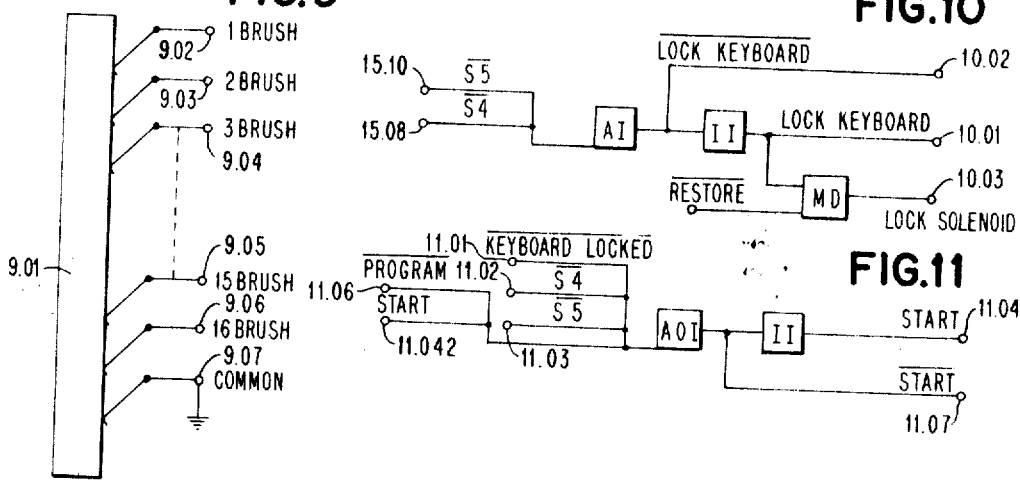
FIG. 9
FIG. 10
FIG. 11

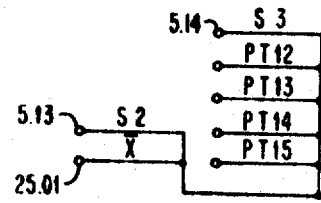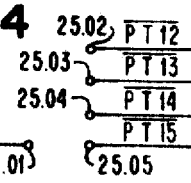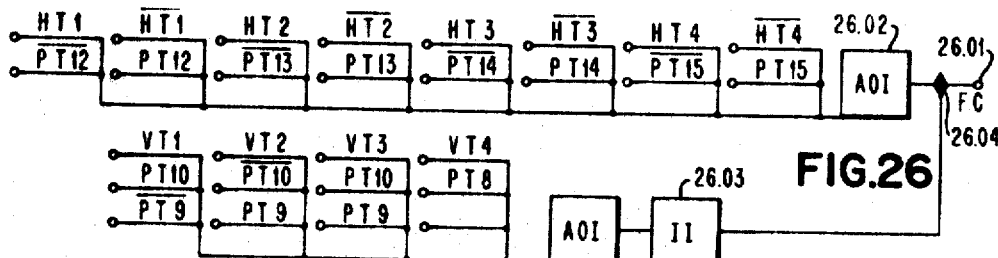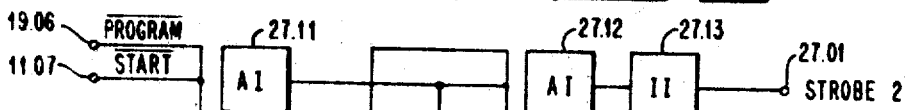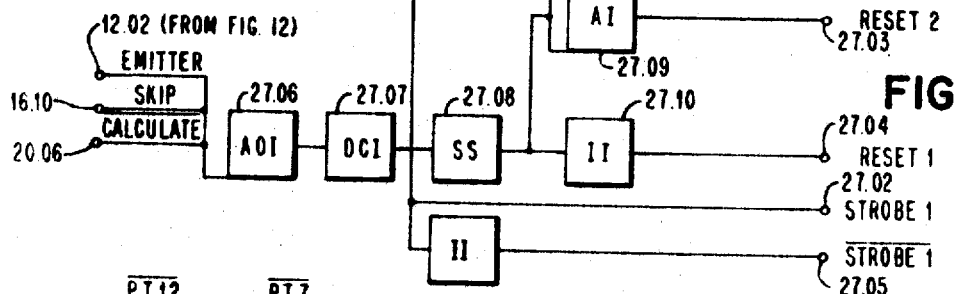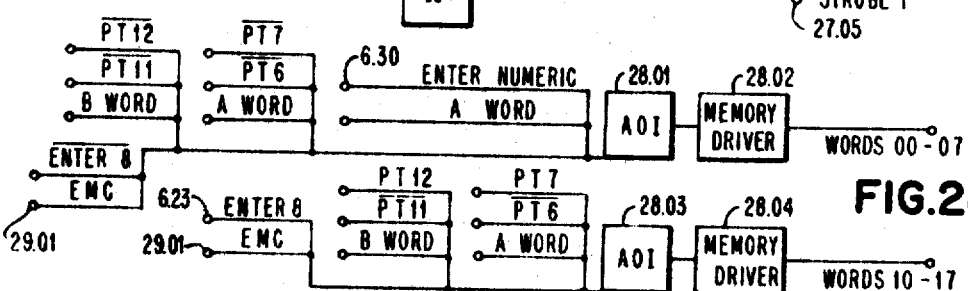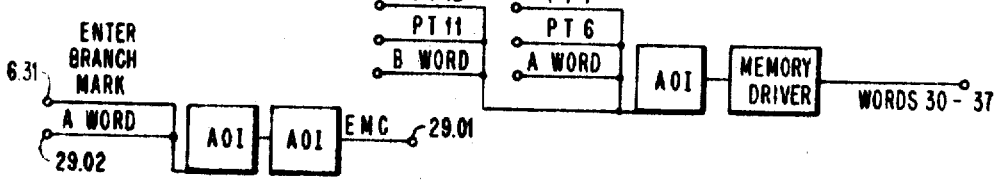

United States Patent Office 3,447,134
Patented May 27, 1969

3,447,134
PROGRAMMING APPARATUS ON A DOCUMENT PRINTER
Bernard G. Thompson, Chandlers Ford, England, and William L. McDonald, Lexington, Ky., assignors to International Business Machines Corporation, Armonk, N.Y., a corporation of New York
Filed Aug. 11, 1966, Ser. No. 571,778
Int. Cl. G06f 7/10
U.S. Cl. 340—172.5     27 Claims

ABSTRACT OF THE DISCLOSURE

The invention relates to programming apparatus having prerecorded or punched record media correlated for program control purposes with horizontal, vertical, and/or coordinate locations on a document in a printer. The system has a first tape for sensing the vertical position of an accounting form, such as an invoice, and a second tape for sensing the horizontal position of the form. An auxiliary program control tape loop is provided that coperates with, but that is independently located from the coordinate tape arrangement associated with the printer. The auxiliary program tape is used for a variety of control purposes including arithmetic functions, and printer control instructions. Also, the auxiliary tape outputs may be used to directly address locations in memory. The auxiliary program tape contains program instruction sets, each related to a particular coordinate location on the document. It is searched at high speeds for a desired program sequence and provision is made for selecting alternative Branch sequences. Sequences on the tape can also be selected manually irrespective of their relationship to the locations on a document.

An accounting system in which the inventive arrangement disclosed herein finds utility is described in U.S. patent application Ser. No. 248,110, filed Dec. 28, 1962, entitled, "Electronic Computing Business Machine," with W. L. McDonald et al., as inventor, and assigned to the same assignee as the present invention. The McDonald et al. apparatus comprises a computer that incorporates a control panel prewired in accordance with a predetermined program of operating instructions, and one or more printers, each with a single element print head that is rotated and tilted for print selection during successive cycles of operation. Each print head is mounted on a carrier for horizontal movement adjacent an individual document. During successive printing cycles following print selection, the print head is operated against the document to effect the sequential printing of characters. The printers are also provided with the usual printer functional mechanisms such as Carrier Return, Backspace, and Tab.

The McDonald et al. apparatus has provision for sensing the vertical position of an accounting form, such as an invoice, and the horizontal position of the single element print head in relation to the accounting form. Electrical impulses indicative of the respective coordinate positions are used to initiate a particular program routine, as appropriate, for the particular coordinate location on the form. A first continuous loop program tape is associated with the accounting document and has holes punched therein identifying vertical fields on the document. In a usual case, the document is one of a series attached as a continuous form and separated by perforations. As the continuous form comprising individual documents is fed through the printer, the vertical tape is moved and represents, at all times, the vertical position reached on any individual form. Individual printed lines on the document are represented in the tape by coded perforations.

The apparatus also has a horizontal open-ended tape that is mechanically linked to the print element carrier and that is moveable step-by-step as the print element moves adjacent to the document during the printing of each line. The horizontal tape also includes coded perforations that are sensed in order to derive signals representative of the horizontal position of the print element. The signals sensed by the vertical and horizontal tapes are used on an individual basis to effect desired printer functions, or to initiate computer program routines. Also, the outputs of the vertical and horizontal program units are combined by appropriate circuitry to provide a single impulse for preselected coordinate locations on the document, determined by the vertical location on the document and the horizontal location of the print element. The coordinate signals are also used to initiate printer functions, program routines, and similar operations. The McDonald et al. apparatus has provision for determining the present vertical, horizontal, or coordinate location on a document and seeking a new vertical, horizontal, or coordinate location, as may be required during the program. The McDonald et al. apparatus provides considerable programming power for an accounting machine.

Another prior programming arrangement having only a single program tape correlated with the horizontal positions of a document during preparation is described in U.S. Patent 3,012,713, entitled "Typewriting Calculating Machine," with R. K. Richards as inventor. The Richards apparatus includes perforations arranged in eight (8) channels of the tape for controlling punctuation, digit field, addressing of memory, and similar functions.

Other prior art arrangements have made use of a vertical media alone that is correlated with the vertical position of a document for program control. Provision has been made for commands and storage addresses in the program media.

Generally, the prior art arrangements have had some measure of inflexibility since the functions or addressing actions are predetermined and are established to invariably be initiated when particular vertical, horizontal, or coordinate positions on the printed document are reached. In many cases, such as the Richards' apparatus, a selected horizontal position on the program tape can serve only one horizontal location on the form, requiring that the fields be staggered in order to avoid overlapping of the fields. Only limited provision is made for alternative programs. Since the program tapes are usually made dependent upon the physical location of the printer in relation to the document, the program tapes are somewhat simpler to implement but cannot readily accommodate alternative routines as required during the accounting operations.

Acordingly, an object of the invention is to provide simplified programming control for accounting systems with increased programming flexibility.

Another object of the invention is to provide for alternative program machine routines during the course of an accounting machine program.

Still another object of the invention is to provide programming control for functions, and addressing of data in a memory.

A further object of the invention is to provide for operator oriented selection and control of a plurality of available program routines.

Still another object of the invention is to provide additional programming capabilities that are adaptable for use with horizontal programming, vertical programming, or coordinate programming, as desired.

Another object of the invention is to provide programming facilities for accounting systems that are correlated with vertical, horizontal, or coordinate document format locations.

A further object of the invention is to provide for the manual stepping of a program media for checking purposes.

Still another object of the invention is to provide program tape control with non-sequential program access.

Also, an object of the invention is to provide program control facilities that minimize the necessity for pre-wired accounting machine control panels.

In order to accomplish these and objects of the invention, an auxiliary program control tape is provided that cooperates with, but that is independently located from a vertical, a horizontal, or a coordinate tape arrangement associated with the printing means. As an example, the auxiliary program tape may contain a plurality of program instructions, each related to a particular coordinate location on a document printed during an accounting procedure. The auxiliary program unit is searched at high speeds for a desired program sequence and provision is made for selecting alternative sequences as required during the accounting operation.

Since the auxiliary program tape is not dependent upon the vertical or horizontal dimensions of a document, it is provided in any length that is required to accommodate the total number of program sequences desired.

Provision is made for manually stepping the program tape in order to visually observe any selected area for checking purposes. Also, provision is made for manually selecting any of the program sequences on the tape irrespective of their relationship to the locations on a document. Use is made of Branch and Branch Stop instructions that are dependent on marks stored in a memory by manually operated Branch Mark Keys.

The foregoing and other objects, features, and advantages of the invention will be apparent from the following more particular description of the preferred embodiment of the invention as illustrated in the accompanying drawings.

In the drawings:

FIG. 1 is a system block diagram of the program control arrangements of the present invention.

FIGS. 2a, 2b, and 2c, when arranged as shown in FIG. 3, represent a typical wave form and operating sequence encountered in the apparatus of FIG. 1.

FIG. 4 represents pulse wave forms encountered during the entry of a Branch Mark into the system of FIG. 1.

FIG. 5 shows a number of circuits associated with Start keys and horizontal and vertical program tape contacts.

FIG. 6 shows a number of Numeric key entry contacts and associated circuits.

FIG. 7 shows the Numeric keyboard Restore magnet and the Alphanumeric lock magnet.

FIG. 8 shows the circuit for effecting a locked keyboard.

FIG. 9 illustrates the brush hardware associated with the auxiliary program tape.

FIG. 10 is another circuit associated with the keyboard locking action.

FIG. 11 shows a Start circuit.

FIGS. 24 and 25 are Start key control circuits.

FIG. 26 shows circuits associated with Forms Control (FC) function.

FIG. 27 is a strobing and reset circuit.

Figure 30:
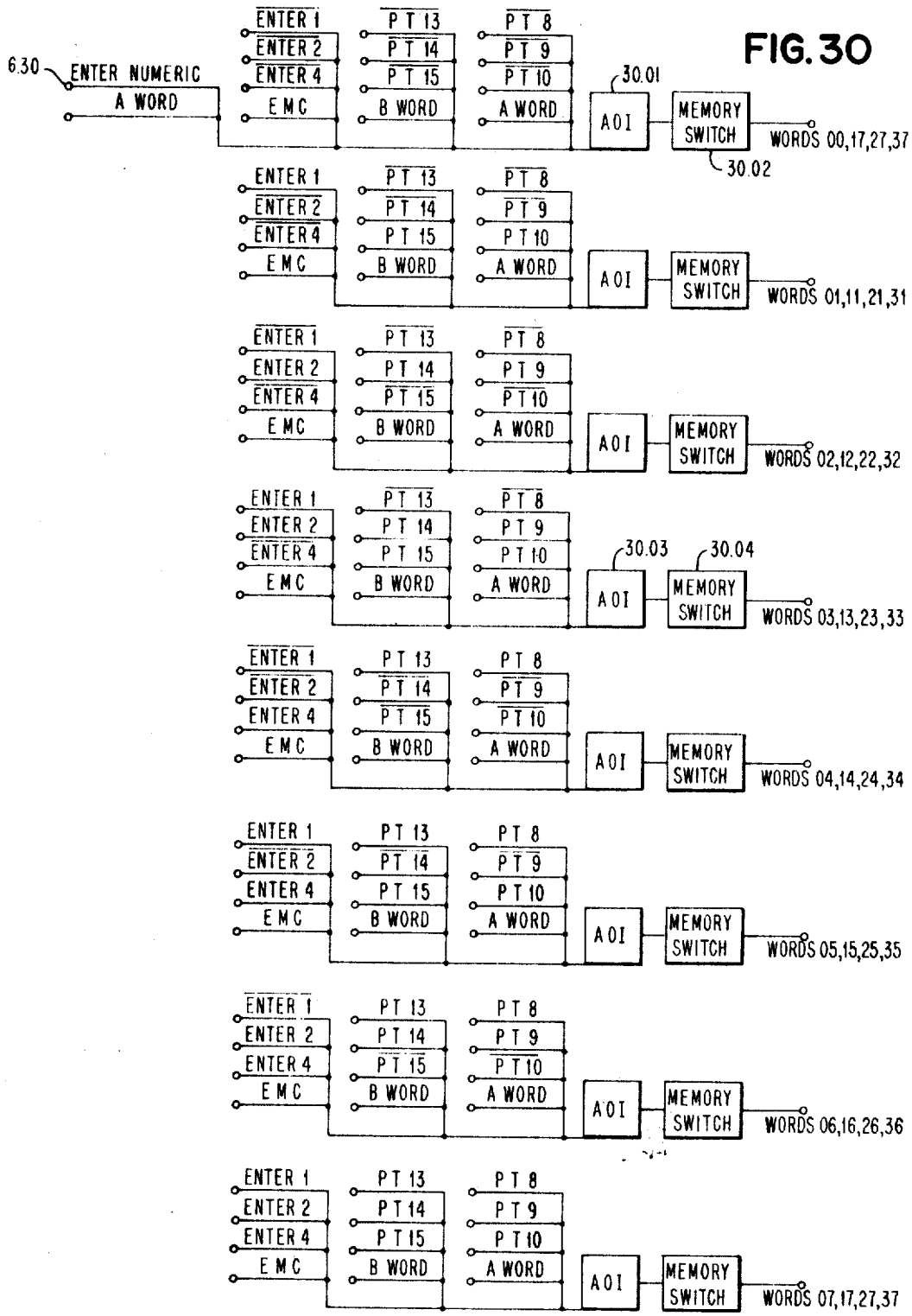

FIGS. 28, 29, and 30 represent memory addressing and entry control circuits.

GENERAL DESCRIPTION

Figure 1:
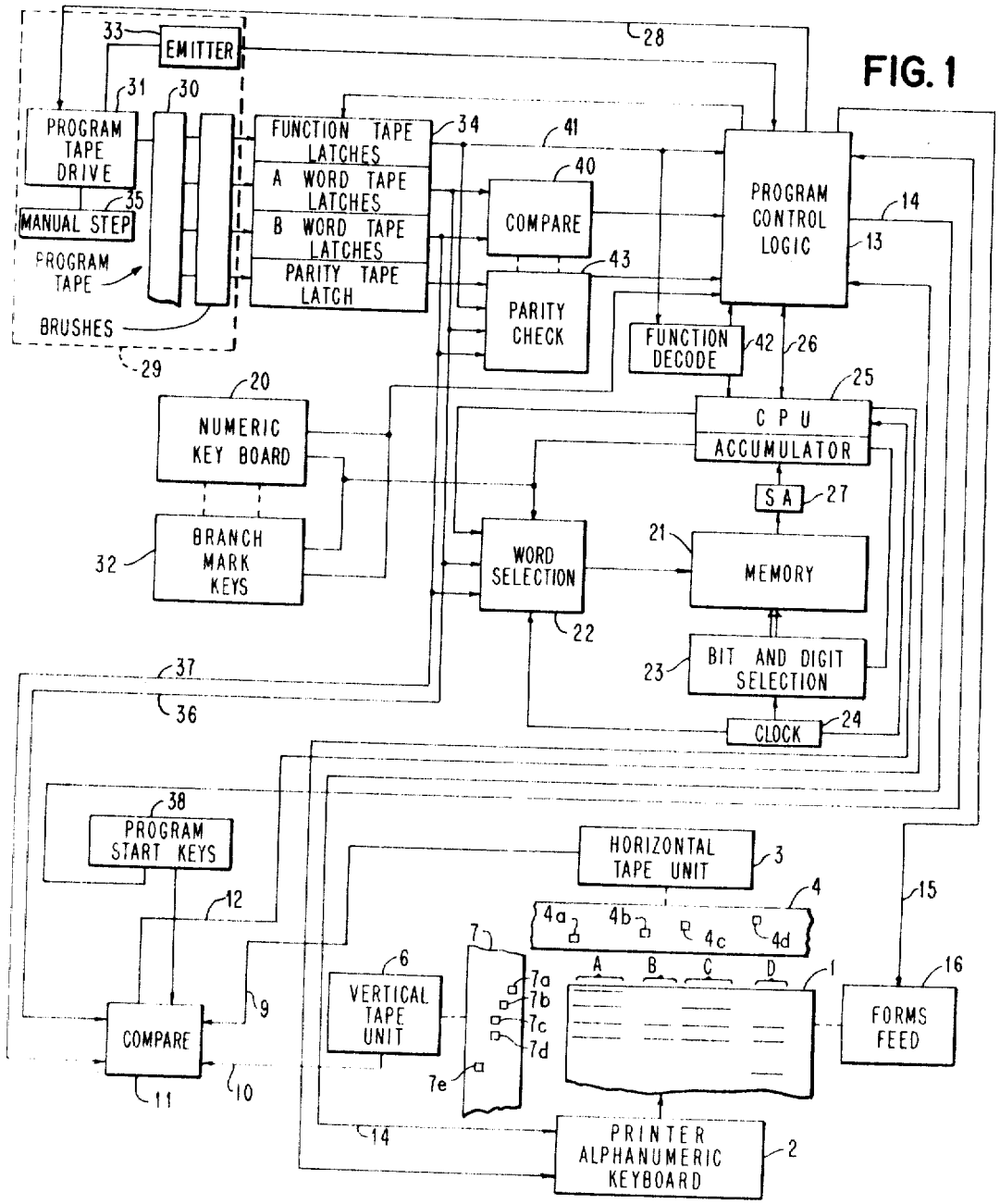

In FIG. 1, a document 1, such as an invoice, is under preparation in a combined printer-alphanumeric keyboard unit 2. Associated with document 1 is a horizontal tape unit 3 with a horizontal tape 4 having perforations 4a–4d that are physically positioned to represent four horizontal fields, A, B, C, and D on document 1.

Also associated with document 1 is a vertical tape unit 6 with an associated vertical tape 7. Vertical tape 7 has perforations 7a–7e representative of lines of printed information on document 1. The perforations in the horizontal tape 4 and the vertical tape 7 are directed by lines 9 and 10, respectively, to a Compare circuit 11 and from there by line 12 to the program control logic 13. Program Control logic 13 controls the feeding of document 1 by line 15 controlling the Forms Feed block 16. By combining the sensed outputs of tape units 3 and 6, signals representative of coordinate locations on document 1 are derived, as set forth in the aforementioned McDonald et al. application. The McDonald et al. system provides for automatic data processing programs controlled by the coordinate signals.

The factors required during accounting operations are entered by a Numeric keyboard 20 into memory 21 at word locations designated by the Word Selection block 22. Memory 21 comprises a core memory, for example, wherein numeric factors are represented by the well known 1-2-4-8 combination with the individual digits and bits selected in a sequential manner under control of the bit and digit selection block 23. Clock 24 controls timing in the system. The storage of numeric information in memory 21 is comparable to the arrangement used in the aforementioned Richards' patent.

Provided in an auxiliary program control unit is a program tape 30 with associated tape drive 31. Program tape 30 may assume any desired form, but in a typical case comprises perforations arranged in channels across the tape.

The tape channel configuration used in the present inventive arrangements are as follows:

TAPE LAYOUT

| Channel | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| | Function Specification | | | | | A Word Specification | | | | | B Word Specification | | | | | Parity |
| | F1 | | F2 | | | A1 | | A2 | | | B1 | | B2 | | | |
| Binary Weights | 2 | 1 | 4 | 2 | 1 | 2 | 1 | 4 | 2 | 1 | 2 | 1 | 4 | 2 | 1 | |
| Numonic Instruction | | | | | | | | | | | | | | | | |
| Example 1 130520 | X | | X | X | | | X | | X | X | X | | | X | | X |
| Example 2 001732 | | | | | | X | X | X | X | X | X | | | X | | |
| Example 3 040602 | | X | | | | | X | X | | | | | | X | | X |

The program tape 30 comprises 16 channels. The Function portion of program tape 30 has 5 channels, the A word specification has 5 channels, the B word specification has 5 channels, and the Parity checking comprises one channel.

The five channels within a group are assigned numeric weights. For example, Channel 1 represents a "0" or "2" and Channel 2 represents a "0" or "1." Channels 3, 4, and 5 represent the 4 bit, 2 bit, and 1 bit of another decimal number.

The channels associated with Function, A word, and B word codes are further subdivided into channel groups designated F1 and F2 for the function channels with F1 comprising channels 1 and 2, and F2 comprising channels 3, 4, and 5. The same applies to the A word specification with Group A1 comprising channels 6 and 7, and Group A2 comprising channels 8, 9, and 10, and the B word specification with Group B1 comprising channels 11 and 12, and Group B2 comprising channels 13, 14, and 15.

This allows the 32 combinations of tape perforations to be written numonically as a two-digit number.

The two-digit number has the following range:

00
01
to
07
10
11
to
17
20
to
27
30
to
37

Thus, the complete instruction is represented as a six-digit number of the form; F1F2–A1A2–B1B2. F1F2 represents the programmed function, A1A2, an A word address, and B1B2 a B word address.

The word addresses in the A1A2 and B1B2 locations of program tape 30 provide for the addressing of 32 words in memory 21. These are defined by the 00–07, 10–17, 20–27, and 30–37 addresses, totaling 32. However, the number of channels available can establish a greater number of addresses, if required. The A word channels 6, 7, 8, 9, and 10 may be set up to address 32 words in a first group of memory locations and the B word channels 11, 12, 13, 14, and 15 could be set up to address 32 word locations in a different group. Assuming memory 21 has four groups of word locations designated A, B, C, and D, comprising 16 word locations each, the program tape 30 can be set up to address all of the word locations involved. The system may be programmed to establish word locations 00–07 and 10–17 (sixteen words) as primary word locations to be selected by the A word perforations, unless controlled otherwise. Word locations 20–27 and 30–37 (sixteen words) may be considered as secondary locations. The switching to another group of 32 words in memory 21 by A1A2 or B1B2 may be accomplished by a special function instruction in program tape 30.

Each row in the tape represents one program step. The steps provided in the program tape 30 are essentially sequential in nature but branching is available under control of Branch Marks stored in memory 21 by keys 32 through Program Control logic 13. In order to locate program sequences in tape 30, provision is made in tape drive 31 to skip tape 30 at high speeds while reading the perforations in the tape. Synchronization of the reading operation is established by an emitter 33. Signals derived from the perforations are directed to a temporary latch type storage unit 34 comprising Function Tape latches, A word tape latches, B word tape latches, and a Parity tape latch. These latches are shown in greater detail in FIG. 14.

PROGRAM TAPE AND CPU CONTROL CODES

The primary program tape and CPU control codes are as follows:

Routine Beginning

Code: 30 A1A2 B1B2

The Routine Beginning is used to define the beginning of a program routine. When Start Key 1 is depressed, the program loop skips to the Routine Beginning with the B1B2 code corresponding to the code in the horizontal tape 4 and A2 code corresponding to the code in the vertical tape 7. If Start Key 2 or 3 is depressed the program tape skips to a Routine Beginning with a B1B2 address of either 00 or 17.

A2 1 Vertical Tape Channel 1 Punched
    2 Vertical Tape Channel 2 Punched
    3 Vertical Tape Channel 3 Punched
    4 Vertical Tape Channel 4 Punched B1B2 is the Horizontal address (00 to 17)

Branch

Code: 32 A1A2 B1B2

The Branch Instruction may effect skipping of the program tape loop unconditionally, depending on the condition of a Branch Mark in memory 21. In the Branch Instruction, it is also possible to program a Reset of the Branch Mark and to program a machine Restore to operator control. Several printer functions may also be programmed. Thus, it is possible to overlap the branching with operator entry and printer operation.

A1:
  0 No Printer Function
  1 Carrier Return
  2 Tab
  3 Carriage Open

A2:
  0 Continued Reset Branch Mark—Branch if Mark
  1 Continue Reset Branch Mark—Branch if No Mark
  2 Continue—Branch if Mark
  3 Continue—Branch if No Mark 4 Restore Reset Branch Mark—Branch if Mark
5 Restore Reset Branch Mark—Branch if No Mark
6 Restore—Branch if Mark
7 Restore—Branch if No Mark B1B1 Branch address*

*Branch addresses 00 to 17 address a corresponding Branch Mark (a bit stored in memory) which may be set or reset by either the operator, program or test instruction.

Branch addresses 20 to 37 address no Branch Mark, but will cause the program loop to branch if the Branch Instruction A2 code is programmed Odd (Branch if No Mark). If the A2 code is even, no Branch will occur and the instruction may be used to program a printer function or restore the system to the operator mode.

Branch Stop

Code: 31 A1A2 B1B2

The Branch Stop instruction is the instruction to which the program loop skips following a Branch Instruction. The program loop skips to the first Branch Stop Instruction whose A1A2 code correspond to the B1B2 code in the Branch Instruction.

A1A2 Branch Instruction Address

Compare

B1B2 Branch Stop Address

Test

Code: 16 A1A2 B1B2
A1 Test Control
0 Zero test the B1B2 word of memory Set Branch Mark 16 if zero.
1 Negative test the B1B2 word of memory Set Branch Mark 17 if Negative.
2 Set Branch Mark B1B2
3 Reset Branch Mark B1B2
B1B2 Memory Address (00 to 37) or Branch Mark Address (00 to 17).

Other Program instructions of interest are as follows:

Type—
00 A1A2 B1B2 Type
01 Type with commas
02 Type and suppress the space after type
03 Type with commas and suppress the space
04 Type and reset memory
05 Type with commas and reset memory
06 Type high order asterisks/ Date*
07 Type high order asterisks with commas
B1 Punctuation
0 No punctuation
1 3-Place decimal
2 2-Place decimal
3 1-Place decimal
B2 Field Width**
0 FW2
1 FW4
2 FW6
3 FW8
4 FW10
5 FW12
6 FW13 High order spaces suppressed
7 Customer selected FW
A1A2 Memory address

* To obtain date punctuation 06 is programmed with no punctuation. The 06 instruction for high-order asterisks is only valid for punctuation 1 or 2 decimal places.

** These may be odd field widths instead of even field widths. (FW1, 3, 5, etc.)

Add 10 A1A2 B1B2
Add the B address to the A address.
Subtract 11 A1A2 B1B2
Subtract the B address from the A address.
Transfer+ 12 A1A2 B1B2
Clear the A address and add the B address to it.
Transfer— 13 A1A2 B1B2
Clear the A address and subtract the B address from it.

Distribution Memory:
17 A1A2 B1B2
B2 Distribution memory control
0 Load dist. memory register, Modify next inst. A word.
1 Load dist. memory register, Modify next inst. B word.
2 Load dist. memory register
3
4 Modify next inst. A word.
5 Modify next inst. B word.
6
7

*The branch commands (Branch Marks) are stored in the 2 bit position of the Sign digit in memory 21 and are addressed in a Branch Instruction.

Multiply 20 A1A2 B1B2
Multiply the buffer (Word 00) by the B word and store the product in the A word.
Divide 21 A1A2 B1B2
Divide the buffer (Word 00) by the B word. Store the quotient in the buffer and the remainder in the A word.
Shift 22 A1A2 B1B2
B1 Shift control
0 Shift Left
1
2 Shift right
3 Shift right and round off
B2 Shift amount
1 Shift 1 place
2 Shift 2 places
3 Shift 3 places
4 Shift 4 places
A1A2 Memory address of word to be shifted Program Entry—
23 B1B2 A1A2
B1B2 The BCD code of a decimal digit entered into the tens position of the buffer.
A1A2 The BCD code of a decimal digit entered into the units position of the buffer.

Auto Functions—
33 A1A2 B1B2
A1 Auto Function control
0
1 CR and forms skip
2 Tab
3 Carriage Open
A2 Auto function modifier

| A1-1 | A2-2 | A1-3 |
|---|---|---|
| A2: | | |
| 0 Single Index | Tab | Carriage Open. |
| 1 Forms Skip 1 | JI | Carriage Open Right. |
| 2 Forms Skip 2 | Tab Left | Rt Feed Rolls open. |
| 3 Forms Skip 3 | Tab Left and Index | |
| 4 | | |
| 5 | | |
| 6 | | |
| 7 | | |

Alpha Print—
37 B1B2 A1A2
B1B2 A1A2 Tilt rotate code for alphanumeric printer 2.

PROGRAM ROUTINES, SUBROUTINES, AND ALTERNATE ROUTINES

Programs used in accounting machine applications consist of a number of routines that are associated with different positions on a form. For example, there are columns on the form for debit and credit, regular and overtime hours, and/or price and quantity. The operator of the equipment escapes the printer to one of the columns on the form, energizes one of the Start keys, and a desired routine defined by the particular location on the form is then initiated automatically by the system. Many times, there are program routines or subroutines that are not oriented to a particular location on the form. These routines may be encountered frequently in lumber and discount billing, and other applications.

Typical accounting sequences that are conveniently and expeditionsly handled according to the present invention are as follows:

Non-Sequential Program Tape Operation

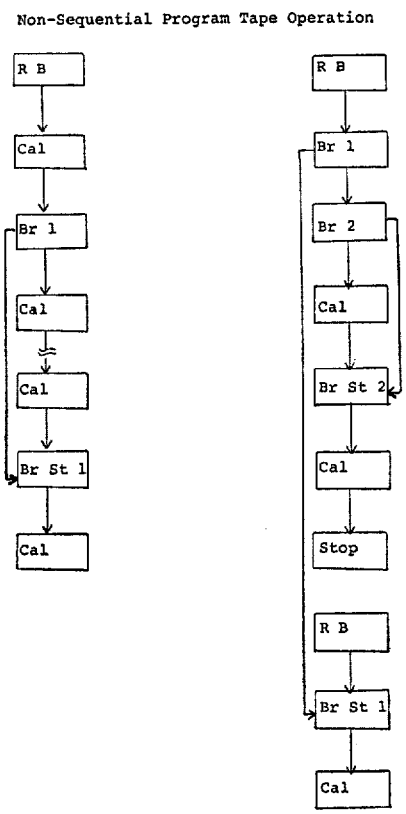

During a normal accounting operation, coded addresses of the horizontal and vertical coordinate document locations are directed to Compare unit 11 for comparison with a corresponding Routine Beginning code in tape 30 as derived from the A word and B word latches by lines 36 and 37. Following the location of a desired programmed routine, on tape 30, the next succeeding rows of perforations are then sensed in a sequential fashion for executing the program. The initiation of a search of this nature is performed by depression of a selected one of the Program Start keys in block 38.

The information stored in the A word tape latches and the B word tape latches is checked in a Compare block 40 to determine whether a Routine Beginning has been located in tape 30. During the sequential sensing of a program routine, the A word and B word are applied to Word Selection block 22 for selecting the required A word and B word for each program step as it occurs. The Function Tape latches are applied by line 41 to Program Control logic 13 and to a Function Decode block 42 for determining the function required for each program step. During the sensing of the perforations on tape 30, a parity check is maintained by block 43.

During the sensing of tape 30 to find a Routine Beginning, the A word latches are compared with the vertical tape coding in tape 7 and the B word latches are compared with the horizontal tape coding in tape 4.

The various functions established by the function tape latches may be printer control functions by line 14 from the program control logic 13. They may also control the Central Processing Unit (CPU) 25 by line 26. The CPU 25 contains an accumulator for performing arithmetic operations with numeric factors derived from memory 21 through the Sense Amplifiers (SA) 27.

The function tape latches in block 34 may, as an example, establish an Alphanumeric Print operation or an Alphanumeric Entry operation involving printer 2. As another alternative, the A word tape latches and the B word tape latches may be interpreted as related to the rotate and tilt selection operations for the single element print head in printer 2 for directly controlling the printing of terms such as "TAX" or "DISCOUNT."

During an accounting operation, many exceptions to the normal routines are encountered. As an example, during selection of pricing, the operator decides whether a unit price, a price per hundred, or a price per thousand applies in a particular case. As another example, in payroll applications, the system decides whether or not an employee F.I.C.A. deductions have exceeded the limit, and reached the point where no deductions are required. The ability to handle exception routines of this nature is of prime importance in any accounting operation.

To handle alternate routines, program tape 30 is provided with codes designated "Branch Instruction." The Branch Instruction includes a Branch Address in memory 21. The CPU 25 checks the specified location in memory 21 which is designated "Branch Mark" to determine if the operator has set the Branch Mark location by operation of one of the Branch Mark keys 32. In a typical case, the Branch Mark is represented by a single core that is set in the memory. Each of the Branch Mark keys has an associated core location in memory 21. The setting of the Branch Mark location is usually performed just prior to the operation on the form requiring that particular exception Branch. As an example, in a payroll application, a particular employee may have overtime earnings that have to be handled by one of the Branch routines.

Upon recognition that the Branch Mark in memory 21 has been set, Program Control logic 13 controls the program tape drive 31 by line 28 to search for a "Branch Stop" associated with the particular Branch Instruction address in question.

The B1B2 portions of the B word specification establish the particular Branch Routine that is required. As an example B1B2 may contain the digits "20." During the subsequent search operation for the Branch Routine, the digits in B1B2 of the Branch Instruction are compared with the digits in the A1A2 locations of the succeeding program code combinations to locate a Branch Stop Instruction having an A1A2 portion with the same digits "20." A comparison at this point indicates that the Branch Routine is located in program tape 30. Following the termination of the various Branch Routines required for a program, an instruction designated "Restore" is placed in the program tape 30 which changes the mode to an Entry mode, during which the operator can enter numeric information, can enter a Branch Mark into the appropriate location in memory 21, or can enter alphanumeric information, as desired.

In a typical case, the depression of the Program Start key 1 initiates a search for a Routine beginning having a code corresponding to a coordinate location in the horizontal and vertical tapes. Program key 2 is selected for the address 00, such as the first routine required for each accounting document. Program key 3 is selected for the address 17. The address 17 is chosen arbitrarily from among address 00 through 07 and 10 through 17 as an alternate routine for additional flexibility.

The determination of the presense of a Branch Mark in memory 21 may be made by the initiation of a Branch Address Instruction or a test instruction from Program Control logic 13. Program tape 30 may contain Test instructions which initiate the test for the zero condition and if the condition prevails, the control logic 13 sets the appropriate Branch Mark location in memory 21.

Program tape checking

Provision is made to manually step program tape 30, by the Manual Step circuit 35, FIG. 1. This enables the operator to check the tape perforations in sequence and at slow speed.

BASIC CIRCUITS AND ABBREVIATIONS

The control circuits of FIGS. 5 through 30 include a number of circuit blocks having abbreviations and functions as indicated below:

| Abbreviation | Circuit | Operation |
| --- | --- | --- |
| AI | And-Invert | Invert: Single input-single output. Output is reverse of input. |
| AOI | And-Or-Invert | And: All inputs high output/low. Or: Any input low-output high Invert: Single input Single output. Output is inverse level of input. |
| DCI | Direct Coupled Inverter | Connected to AOI circuit. Input logical 1, output logical 0. |
| II | Isolating Inverter | Signal inversion with circuit isolation. |
| INT I | Integrator | Input high-Output high (eliminates effects of contact bounce). |
| MD | Magnet Driver | High current for driving magnet to +48.0 volts. |
| SS | Single Shot | Timed output. |
| TR | Trigger | On—logical "1"; off—logical "0". |
| XOI | Exclusive Or | Two high inputs—high output; two low inputs—high output; inputs different—1 on output. |

The circuits are predicated on predetermined voltage levels, with 12.0 volts representing a logical 1, and 0 volts representing a logical zero. In a typical arrangement, +48.0 volts is used for operation of the Magnet Drivers.

NUMERIC AND BRANCH MARK KEYS

FIG. 6 illustrates circuits directly associated with the numeric keyboard 20, FIG. 1. The circuit of FIG. 6 includes seven Integrators designated 6.01–6.07 that are controlled by contacts in the numeric keyboard. A normally closed contact 6.08 drives Integrator 6.01 to supply an indication that the numeric keyboard is in a restored condition at terminal 6.09. During any numeric entry or entry of a Branch Mark, the keyboard restore contacts 6.08 open, and a Not Numeric Keyboard Restore output is available at terminal 6.25. Keyboard contacts 6.10 through 6.13 drive Integrators 6.02–6.05 to supply binary weighted outputs at terminals 6.20–6.23, respectively, representative of numeric factors to be entered into the system of FIG. 1. As an example, the number "3" is represented at terminals 6.20 and 6.21. If a "0" is entered, only the contacts 6.14 are closed. The entry of numeric factors occurs upon closure of contact 6.14.

A Branch Mark is entered upon closure of contact 6.15. The sequence is shown in FIG. 1. Closure of one of the Branch Mark keys in block 32, FIG. 1, also operates the binary weighted contacts 6.10–6.13, FIG. 6, to supply a coded output at terminals 6.20–6.23 for entry of a Branch Mark. In the present case, with an assumed capacity of 32 words in memory 21, the Sign digit position in half of the 32 words, and more particularly the 2 bit position in the Sign digit is used for the storage of Branch Marks. Therefore, 16 Branch Mark keys are provided in block 32 for entry of a Branch Mark indication into each of the 16 words of memory.

Figure 17:
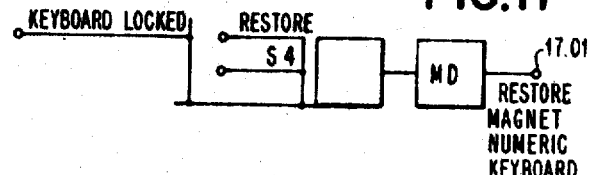
FIG. 17 represents circuits for effecting restoration of the numeric keyboard.

FIG. 7 shows a numeric keyboard restore magnet 7.01 that is driven from terminal 17.01, FIG. 17, and an alphanumeric keyboard lock magnet 7.02 that is driven from terminal 10.01, FIG. 10, and which locks the alphanumeric unit 2, FIG. 1, during any operation of program tape 30. The circuit in FIG. 8 is operated by the alphanumeric keyboard lock contacts 8.01 to provide an indication at terminal 8.02 that the alphanumeric keyboard is actually locked.

Figure 15:
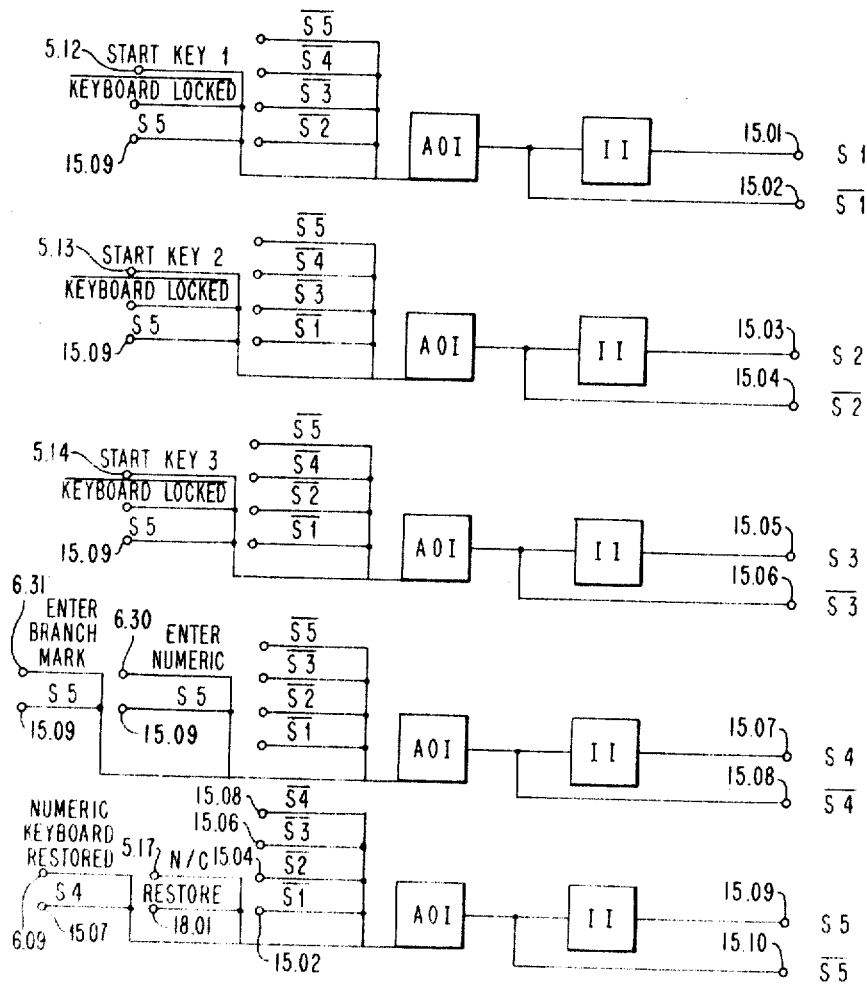
FIG. 15 illustrates circuits associated with various Start keys and entry control keys.

The circuit of FIG. 10 depends on various conditions derived from FIG. 15, including Not S5 and Not S4 for energizing various locking mechanisms associated with the keyboards.

PROGRAM START KEYS

FIG. 5 shows circuits associated with the program Start keys 1, 2, and 3 designated 5.01, 5.02, and 5.03, respectively. The program start contacts are connected in series to drive Integrator 5.04 for a Normally Closed (N/C) output at terminal 5.17 when none of the program Start keys is operated. Voltage from line 5.05 is directed from each of the contacts, when transferred, to a respectively associated Integrator 5.06, 5.07, and 5.08.

KEY-CONTROLLED LATCH CIRCUITS

FIG. 15 shows interrelated latch circuits associated with various key controlled inputs, primarily from FIGS. 5, 6, and 11. The circuit in FIG. 15 comprises five latch combinations of AOI–II blocks with S1, Not S1 through S5 and Not S5 outputs at terminals 15.01–15.10. When none of the Start keys 1, 2, and 3 designated 5.01, 5.02, and 5.03, FIG. 5, or the Enter Numeric contacts 6.14 and Enter Branch Mark contacts 6.15, FIG. 6, are active, the output at terminal 15.09, FIG. 15, that is the S5 output is high. This gates all of the other AOI–II combinations in FIG. 15 for subsequent activation. Depression of Start key 1, Start key 2 or Start key 3, FIG. 5, activates integrators 5.06–5.08 whose outputs at terminals 5.12–5.14 sets the respectively associated latches in FIG. 15 to provide outputs at terminals 15.01, 15.03, or 15.05, respectively. The Enter Numeric or Enter Branch Mark outputs from terminals 6.30 and 6.31, FIG. 6, activate the associated latch in FIG. 15 and the output at terminal 15.07 becomes high.

Activation of any of the Not outputs from terminals 15.02, 15.04, 15.06 or 15.08 resets the latch for S5 so that the S5 output at 15.09 drops to the low level. The circuits in FIG. 15 are mutually exclusive so that only one of the circuits is active at any one time. The modes established by the circuits of FIG. 15 are as follows:

S5 Restore Mode
S1 Compare Program tape with coordinate positions on document
S2 Check for Routine Beginning of "00"
S3 Check for Routine Beginning of "17"
S4 Enter Branch Mark or Enter Numeric The S4 output at 15.07 initiates appropriate programs by program control logic 13, FIG. 1, to set a Branch Mark core in memory 21 or to enter a numeric factor.

Following initiation of an Enter Branch Mark or Enter Numeric routine and occurrence of the S4 output at terminal 15.07, the S5 latch is re-established by the Numeric Keyboard Restore level at terminal 6.09, and the S4 input to the S5 circuit, FIG. 15.

Figure 18:
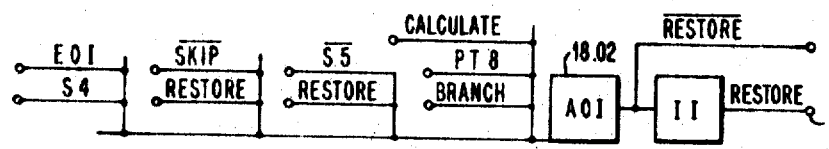
FIG. 18 represents other circuits associated with restore action in the apparatus.

Upon completion of a Start Key routine, the circuit of FIG. 15 returns to the restore mode. The re-establishment of the S5 AOI–II latch, FIG. 15, occurs when a Restore signal from terminal 18.01, FIG. 18, is applied together with a Normally Closed (N/C) signal indicative of no key depression on the numeric keyboard from terminal 5.17, FIG. 5, to the corresponding terminal in FIG. 15.

MEMORY SELECTION

Figure 14:
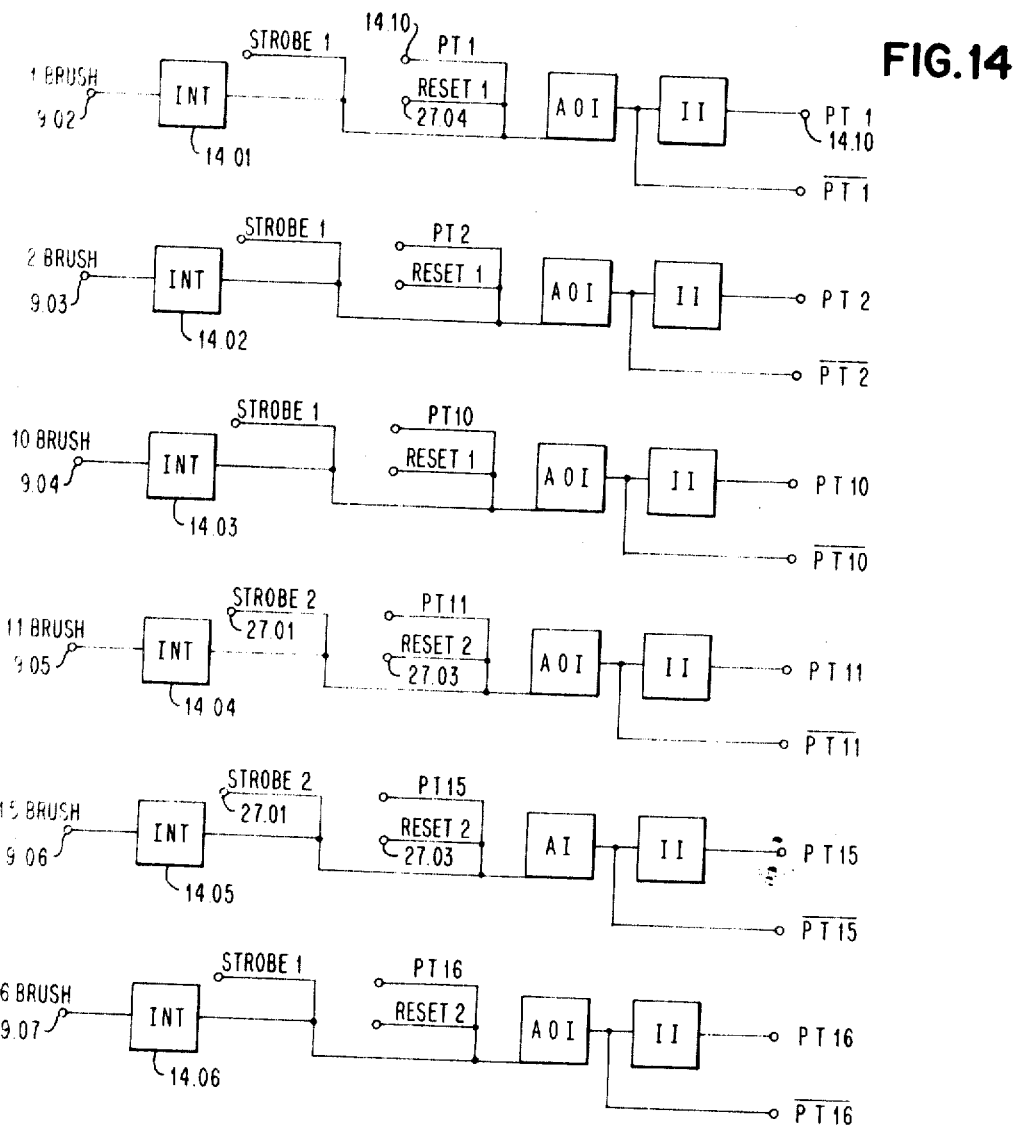
FIG. 14 illustrates latch storage circuits that are controlled by the reading brushes in the auxiliary program unit.

The circuits required for addressing memory 21 by the word selection block 22, FIG. 1, are shown in detail in FIGS. 28, 29, and 30. The memory 21 is organized with a plurality of words, each word comprising 13 digits plus a Sign digit, and each digit comprising 4 bits in a 1–2–4–8 configuration. It is further assumed that the memory 21 has 32 words located in four groups of eight words each. The words are designated 00–07, 10–17, 20–27, 30–37 for purposes of selection. Signals derived from the program tape 30 in FIG. 14 are used to establish the proper circuits in FIGS. 28 and 30 for selecting the A word and B word required during a Calculate operation.

For illustrative purposes, it is assumed that the program tape contains an A address of "00" and a B address of "13." The A address of "00" is indicated by the absence of punches in tape channels 6, 7, 8, 9, and 10. In FIG. 28, the Not PT6, Not PT7 and A word inputs condition the AOI circuit 28.01 to drive Memory Driver 28.02. In FIG. 30, the Not PT8, Not PT9, Not PT10 and A word inputs condition the AOI circuit 30.01 to drive the Memory Switch 30.02 for cooperation with the Driver 28.02. The "A word" input is derived from the CPU 25 during the time that it is required that the A word be accessed from memory 21. The address for "13" for the B word is represented by punches in program tape channels 12, 14, and 15, and the absence of punches in channels 11 and 13. In FIG. 28, the Not PT11, PT12, and B word inputs condition the AOI block 28.03 to drive Memory Driver 28.04 for selecting the word group 10–17. In FIG. 30, the Not PT13, PT14, PT15, and B word inputs drive the AOI block 30.03 to select the memory switch 30.04 for word "13."

The circuit of FIG. 29 supplies a signal designated Enter Mark Control (EMC) at terminal 29.01. This signal is applied in FIGS. 28 and 30 at a number of terminals for controlling the entry of Branch Marks as desired to initiate Branch Routines during the progress of the accounting application.

The Enter Mark Control signal occurs as a result of the Enter Branch Mark signal from the terminal 6.31, FIG. 6, as the Enter Branch Mark key is depressed, as well as a clock signal designated "A word," to terminal 29.02 that is derived from the CPU 25.

The Enter Mark Control signal is applied together with a Not Enter 8 or an Enter 8 in FIG. 28 to select one or the other of Memory Drivers 28.02 and 28.04 for words 00–07 or 10–17, respectively. The EMC control is also applied to each of the switch circuits in FIG. 30 to select one of the words in either of the word groups depending upon the state of the Enter 1, Enter 2, or Enter 4 contacts in FIG. 6. In this fashion, a Branch Mark can be inserted in the 2 bit location of the Sign digit of any of 16 words in memory 21.

In order to enter numeric information from the numeric keyboard, the Enter Numeric key 6.14, FIG. 6, is depressed to supply an Enter Numeric signal from terminal 6.30. The Enter Numeric signal is applied in FIGS. 28 and 30 together with an "A word" control from CPU 25 to select Memory Driver 28.02 and Memory Switch 30.02 for selection of the word location "00."

ROUTINE BEGINNING

The initiation and search for a Routine Beginning by depression of a Start key is illustrated in FIG. 2a. The wave forms of FIG. 2a assume that a compare operation takes place followed by initiation of a program and a calculation operation by Program Control logic 13 and CPU 25, FIG. 1. Also shown is the operation when a long calculation is required.

As previously indicated, Start key 1 is depressed in order to find any Routine Beginning code "30" on the program tape 30, FIG. 1. Start key S2 is depressed when a program tape location having a "00" indicated by no perforations in channels 12, 13, 14, and 15 is desired, and Start key S3, FIG. 5, is depressed when a program tape location having a "17" indicated by perforations in channels 12, 13, 14, and 15, is desired.

In FIG. 10, the circuits shown provide Lock keyboard, Not Lock keyboard, and Lock Solenoid signals from terminals 10.01, 10.02, and 10.03, respectively. The Not S4 and Not S5 signals at terminals 15.10 and 15.08, respectively, latch the AI–II blocks to provide the Lock Keyboard signal at terminal 10.01 whenever any of the Start keys 1, 2, or 3, is depressed in FIG. 5.

Figure 19:
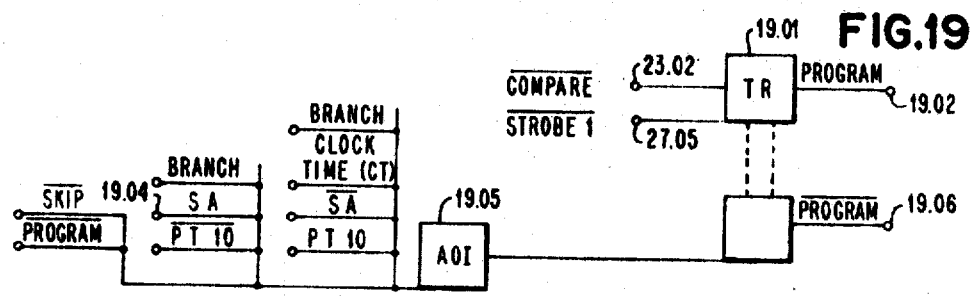
FIG. 19 shows a program trigger circuit associated with the auxiliary program unit.
Figure 20:
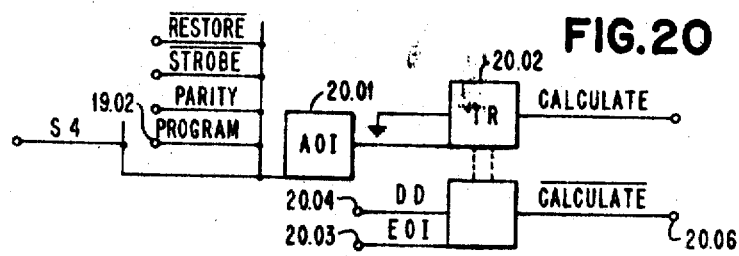
FIG. 20 illustrates a trigger control circuit for establishing a Calculate operation.

Prior to the time that the keyboard becomes locked, a Not Keyboard Lock signal to terminal 11.01, FIG. 11, together with the Not S4 and Not S5 signals to terminals 11.02 and 11.03 set the Start latch comprising the AOI–II blocks in FIG. 11. This provides a Start signal at terminal 11.04. The circuit is latched by loop back to terminal 11.04a together with a Not Program signal to terminal 11.06. The latch circuit of FIG. 11 remains latched until the Program trigger, FIG. 19, is set to its On state.

Figure 13:
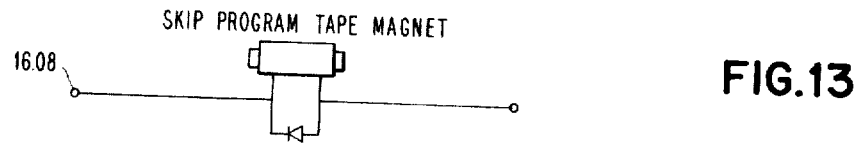
FIG. 13 is a Skip magnet associated with the auxiliary program unit.
Figure 16:
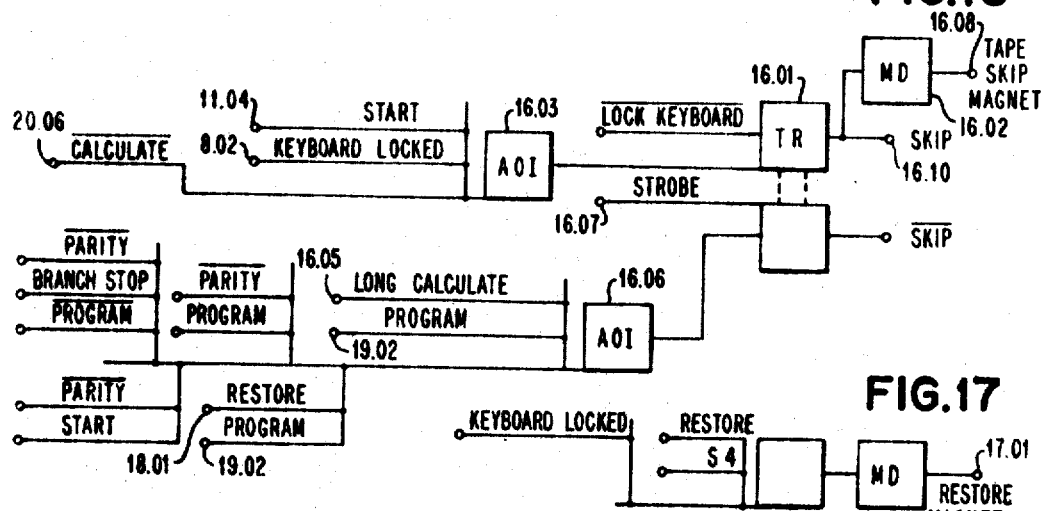
FIG. 16 illustrates various logic associated with a skipping operation in the auxiliary program unit.

Following the setting of the Start latch in FIG. 11, the Skip trigger 16.01 is set to drvie the Magnet Driver circuit 16.02, FIG. 16, and the Program Tape Skip magnet, FIG. 13 from terminal 16.08. The Skip trigger 16.01 is set when the Start signal at terminal 11.04 and the Keyboard Lock signal at terminal 8.02 become high thereby giving a low output from the AOI block 16.03.

The Program Tape unit 29 for reading tape 30, FIG. 1, may take any of many known forms. The reader has provision for skipping the program tape 30 at high speeds while sensing the perforations therein by means of the channel brushes 1–16, shown in FIG. 9. FIG. 9 also shows a common brush, and a conductive mandrel 9.01. Potential passes from any of the brush terminals through a perforation in the program tape 30, and mandrel 9.01 to the common brush.

With the program tape skipping at high speeds, the tape perforations are sensed, and the program unit looks for a Routine Beginning that compares with the coded representation corresponding to the start key that was depressed.

Figure 22:
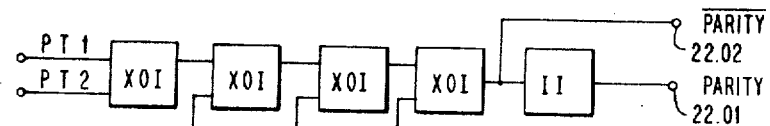
FIG. 22 represents parity checking circuits associated with the auxiliary program unit.

During the reading of the code perforations in program tape 30, signals derived from the perforations are applied to the circuit in FIG. 22 for recognition of an odd parity. All 16 channels of the program tape are applied to exclusive or circuits XOI that are cascaded in an appropriate fashion to supply a parity signal from terminal 22.01 or a not parity signal from terminal 22.02.

The circuit of FIG. 22 also supplies the Branch recognition required for a Branch Search operation at terminals 1, 2, 3, 4, and 5 designated 22.02–22.06.

Figure 12:
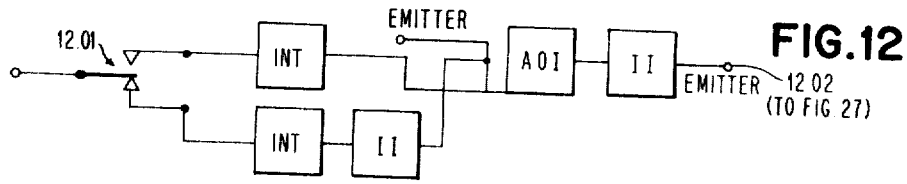
FIG. 12 illustrates a circuit for deriving emitter pulses for timing purposes.

A more precise sensing of the code perforations in the program tape 30 is obtained by use of an emitter contact 12.01 driving a latch circuit and supplying an output at terminal 12.02, FIG. 12. Generally, as the program tape 30 is escaped from one row of perforations to the next, the calculating action, such as an addition, takes place under control of the emitter circuit, FIG. 12.

During scanning of program tape 30, emitter impulses derived from terminal 12.02, FIG. 12, are directed to the circuit in FIG. 27 in order to develop the Strobe 1 and Strobe 2 impulses from terminals 27.01 and 27.02.

In FIG. 14, the brush inputs at terminals 9.02–9.07 drive integrator circuits 14.01–14.06. The circuit of FIG. 14 provides outputs, such as Paper Tape 1 (PT1), and Not Paper Tape 1 ($\overline{PT1}$) representative of the brush sensing of perforations. The circuits of FIG. 14 comprise a plurality of sets of latches each having an AOI block and an II block for storing any sensed perforation. The Transfer of a sensed signal from one of the integrators 14.01–14.06 to its respective latch AOI–II combination occurs under control of the Strobe 1 and Strobe 2 signals, FIG. 14.

The setting of the AOI–II latch combinations in FIG. 14 occurs under control of the Strobe 1 and 2 impulses combined with the integrator outputs to the respective AOI block which then has a low output. This effects a high output from the associated II block. The output of the latch, as from terminal 14.10, is applied to one of the reset inputs of the AOI block. Upon occurrence of the Reset 1 signal from terminal 27.04, FIG. 27, the latch associated with channel 1 is reset and supplies a high output on the Not Paper Tape 1 ($\overline{PT1}$).

Reset 1 and Reset 2 signals are supplied from terminals 27.04 and 27.03, FIG. 27 under control of the Reset Single Shot 27.08.

It is assumed that the horizontal tape 4, FIG. 1, has four channels and that the vertical tape 7, FIG. 1, has four channels. A few of the horizontal tape contacts designated HT1–HT4 and the vertical tape contacts designated VT1–VT4 are shown in FIG. 5. The horizontal tape 4 and the vertical tape 7 move in correspondence with the relationship of the print head in printer 2 with respect to document 1 and the contacts HT1–HT4 and VT1–VT4 are closed when associated star wheels drop into perforations in the respective tapes. Logical outputs, such as Horizontal Tape 1 (HT1) and Not Horizontal Tape 1 ($\overline{HT1}$), are available at terminals, such as terminals 5.10 and 5.11.

The circuit for comparison of the program tape Routine Beginning with the horizontal tape signals and vertical tape signals is shown in FIG. 26. The circuit supplies a high "Forms Compare" signal at terminal 26.01 when the horizontal and vertical coordinate location on the form compares with the Routine Beginning location on the program tape. In order to have a successful compare for Routine Beginning, the output of the AOI block 26.02 and the II block 26.03 must both be high at the Dot Or Connection 26.04.

Figure 23:
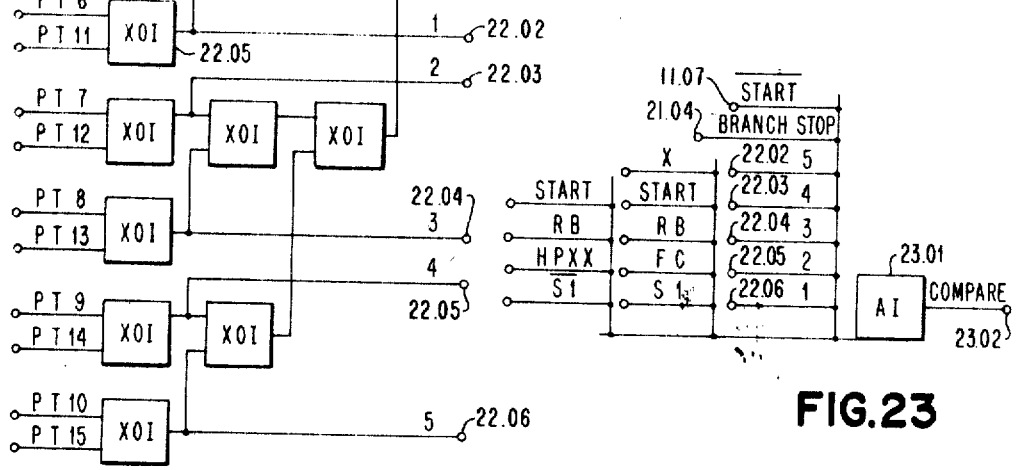
FIG. 23 is a Compare control circuit.

The compare output to indicate that a Routine Beginning has been bound for Start key 1 is shown in FIG. 23 with the X, Start, Routine Beginning (RB), Forms Compare (FC), and Start key S1 inputs high to the AI block 23.01. In the present logic, a compare is indicated by a low signal from the AI block 23.01, FIG. 23.

The AI block 23.01 also has an input HPXX with a Routine Beginning, Start, and a Not S1 to derive a compare output when one of the Start keys S2 or S3, FIG. 5, is depressed. The circuits in FIGS. 24 and 25 are involved in Start key 2 and Start key 3 recognition. The circuit of FIG. 24 provides the HPXX signal from terminal 24.01 when the AOI block 24.02 is conditioned by the inputs S2 and Not X inputs from FIGS. 5 and 25, respectively, are applied. The circuit is also conditioned when the S3 input from FIG. 5 and the Paper Tape channel inputs from FIG. 14 for channels 12, 13, 14, and 15, indicative of a "17" are conditioned. The Not X signal to terminal 25.01 in FIG. 24 occurs as a result of a Not PT12, Not PT13, Not PT14, and Not P*t*15 applied to the terminals 25.02–25.05, FIG. 25.

Therefore, the compare circuit of FIG. 23 will supply an output upon occurrence of the HPXX signal, the Start condition, the Routine Beginning condition, and the Not S1 condition.

Figure 21:
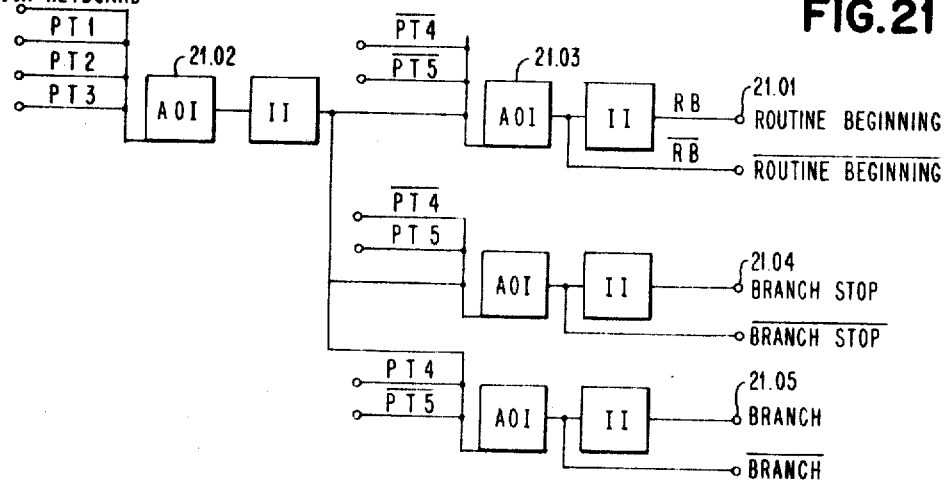
FIG. 21 shows circuits for recognizing Routine Beginning codes, Branch codes and Branch Stop codes designating program sequences in the auxiliary program unit.

The Routine Beginning signal is derived in FIG. 21 from terminal 21.01. The signal occurs upon recognition in the function channels 1–5 of the program tape of the existence of the combination of perforations in channels 1, 2, and 3 to AOI block 21.02 and the absence of perforations in channels 4 and 5 indicated by the Not PT4 and Not PT5 signals to the AOI block 21.03. The numonic code for Routine Beginning is "30." Also shown in FIG. 21 are the circuits for recognizing a Branch Stop function from terminal 21.04 and a Branch Instruction from terminal 21.05. The Branch Stop Instruction has a numonic representation of 31 and the Branch Instruction has a numonic representation of 32.

As indicated before, the Routine Beginning output from terminal 21.01 is applied to two Or circuits in FIG. 23 to establish a compare output from AI block 23.01.

As shown in FIG. 2a, following the compare signal, the Program trigger 19.01 is set, FIG. 19. The compare signal from terminal 23.02 together with a Not Strobe 1 level from terminal 27.05 sets the Program trigger. The Program trigger output at terminal 19.02 together with Not Restore, Not Strobe, and Parity to the AOI block 20.01 sets the Calculate trigger 20.02 on, FIG. 20. The Not Strobe condition indicates that the emitter pulse from the circuit of FIG. 12 and the Strobe pulses from the circuits of FIG. 27 have terminated. Therefore, the Calculate trigger 20.02 is on in time to process the next occurring instruction on program tape 30, FIG. 1. The Calculate trigger 20.02 is set on for any subsequent program sequence on program tape 30, including printer instructions or calculation instructions. The Calculate trigger 20.02 is turned off upon occurrence of the End of Instruction signal (EOI) to terminal 20.03 and the Clock signal "DD" to terminal 20.04 that is derived from Program Control logic 13.

With the Calculate trigger 20.02 on, the signals derived from the program tape brushes at terminals 9.02–9.07, FIG. 14, are supplied to Program Control logic 13 to control the CPU 25 or the printer 2.

Normally, during the execution of any program routine, the program tape 30 is skipped at high speed, the program instructions are read and interpreted and the necessary calculations are performed with no interruption of tape movement. The location of Routine Beginnings takes place at high speed. Upon recognition of a desired Routine Beginning code, the reading of program tape 30 becomes incremental. The programmed instructions are then sampled by closure of the emitter contacts 12.01, the instruction is loaded into the system and the latch circuit of FIG. 12 becomes effective. The calculation is performed at an even higher speed so that it is usually completed prior to the time the emitter contacts 12.01 again make for the next program instruction. Signals developed from the perforations sensed by the 16 brushes in FIG. 9 are applied from terminals 9.02–9.07 to integrator and latch circuits in FIG. 14 to store the coded perforations encountered. Ordinarily, the function recognized from the circuit in FIG. 14 requires no delay of the program tape reader.

Occasionally, an action of the printer 2 may require a longer interval time than that between successive program tape instructions. These include actions such as Carrier Return, or Tab. Also, a long calculation operation, such as a Multiply operation, may take more time than the time between successive perforations in program tape 30. During any long operation, the Skip trigger is set to its off state, thereby stopping the movement of program tape 30. As an example, a Long Calculate signal to terminal 16.05 with a Program gate 19.02 from the Program trigger, FIG. 19, conditions the AOI block 16.06 to turn the Skip trigger 16.01 off. The Long Calculate signal at terminal 16.05 is derived from the Program Control logic 13 upon recognition of any instruction, in the latches of FIG. 15 involving the CPU 25 or printer 2 that requires a long interval time for its completion. The Skip trigger 16.01 is actually turned off when the Strobe signal at terminal 16.07 goes to its low condition.

Upon completion of the Calculate operation for any instruction, a Not Calculate signal from terminal 20.06 is applied in FIG. 16 to set the Skip trigger to its on state and to continue the skipping and reading of the program tape 30.

BRANCHING

The Sign digit of each word in memory 21 contains a 0–0–0–0 for a positive balance and a configuration 8–0–0–1, that is, a "9" to indicate a negative balance. Accordingly, the 2 bit position of the Sign digit is not normally required and is therefore available to serve as a Branch Mark indication for initiating alternate routines or subroutines.

In many cases, it is desired to repeat a particular routine more than once. This is accomplished by placing a Branch Stop Instruction at the beginning of the routine and a Branch Instruction at the end. When the routine ends, the Branch Instruction initiates a search for the Branch Stop Instruction and when found initiates the routine again. In this case, the Branch Operation does not signify subroutine but signifies a repetition of the same routine.

The Branch signal is derived from terminal 21.05, FIG. 21. The Branch signal from terminal 21.05 instructs the CPU 25 to address memory 21 at the word location defined by the B1B2 address in the latches of FIG. 14. These are in the tape channel locations 11–15. Specifically, the routine in the CPU 25 is to address and test for a Branch Mark in the 2 bit location of the Sign digit in the particular word of memory 21 that is indicated by the B1B2 address.

The Branching operation is illustrated in FIG. 2b and is initiated in FIG. 19 by turning off the Program trigger 19.01. If the Branch Mark location is set, an output is derived from the Sense Amplifier 27, FIG. 1, that is applied to terminal 19.04, FIG. 19. The Branch Instruction in the program tape is indicated by a numonic code "32." This, together with a Not Program Tape 10 signal, conditions the AOI circuit 19.05 to turn off the Program trigger 19.01. The occurrence of the Branch Condition initiates a high speed search in program tape 20 for a Branch Stop Instruction, which is a numonic code "31." The turning off the Program trigger conditions the circuits so that the Calculate trigger 20.02 cannot be turned on until the proper Branch Stop location is recognized.

Another input to the AOI 19.05 comprises a punch in tape channel PT10, a Not Sense Amplifier signal, a Branch signal, and a Clock time signal that represents the Signal digit, two bit of the word addressed in memory 21.

The tape reader now searches program tape 30 for a Branch Stop Instruction. With the program trigger 19.01 off, the Start signal from terminal 11.04, FIG. 11, drops. This degates the HPXX and Forms Compare inputs for Start keys 1, 2, and 3 to the AI block 23.01, FIG. 23. The compare block AI 23.01 will then become active only upon satisfaction of the third Or input comprising the signals Not Start, Branch Stop, 5, 4, 3, 2, and 1 in FIG. 23.

The Strobe 2 signal from terminal 27.01, FIG. 27, occurs at a somewhat later time than the Strobe 1 signal from terminal 27.02, FIG. 27. The Strobe 2 signal from terminal 27.01 is supplied to the latch circuit associated with brushes 11–15 in the program tape reader, FIG. 14. The difference in the timing of the Strobe 1 and Strobe 2 impulses from FIG. 27 is used in the Branch Instruction primarily when a search for a Branch Stop Instruction is being made. The Strobe 2 signal from line 27.01 applied to the latch circuits for channels 11–15 in FIG. 14 is degated so that no new information may be entered in these latches while the search continues.

The procedure involves the recognition of the Branch Instruction, the retention of the B1B2 address in the latches in FIG. 14, and the high speed searching for an A1A2 address that corresponds to the B1B2 address set-up in the latches. Upon recognition of the Branch Instruction, the machine is restored. The Branch Stop Instruction whose A1A2 address corresponds with the B1B2 address setup in the latches, FIG. 14, just precedes the alternate routine required for the Branch. The retention of the B1B2 address desired in the latches, FIG. 14, is done by degating the Strobe 2 signal from FIG. 27. Considering FIG. 27, the strobe signals ordinarily are derived by the emitter input to terminal 12.02, the Skip to terminal 16.10, and the Not Calculate input to terminal 26.06 that control the AOI circuit 27.06. The output of the AOI circuit 27.06 goes low, the DCI block 27.07 output goes high, and the Single Shot 27.08 is fired. When the input to Single Shot 27.08 goes high the output also goes high for approximately 10 microseconds. The outputs of the AI block 27.09 and the 2 block 27.10 provide Reset 1 and Reset 2 impulses. The Stroke 1 and Strobe 2 impulses are also derived from the circuits at terminals 27.01 and 27.02. The Strobe 1 output at terminal 27.02 goes high while the Reset 1 signal at terminal 27.04 goes low. This normally is applied to the terminals in FIG. 14, such as terminal 27.04 to reset the latch circuits. The negative going impulse performs the reset operation. During the skipping of the program tape 30, the inputs Not Program at terminal 19.06 and Not Start at terminal 11.07, FIG. 27, are high to condition the AI block 27.11. The output of the AI 27.11 supplies a low signal to the AI 27.12 and the AI 27.09 thereby degating the circuits and preventing the Strobe 2 and Reset 2 impulses from terminals 27.01 and 27.03. Therefore, during any Branch operation, it is not possible to reset the B1B2 latches controlled by brushes 11–15 in FIG. 14.

In this manner, the A1A2 signals derived from the brushes 5–10 are compared with the Branch address stored in latches 11–15, FIG. 14.

In the Branch operation, the outputs from terminals 22.02–22.06, FIG. 22, supply compare indications from the Exclusive Or circuits XOI. As an example, if the signals from tape channels 6 and 11, PT6 and PT11 to the AOI circuit 22.05 are both high then the output at terminal 22.02 is high and if the signals PT6 and PT11 are both low then the output at terminal 22.02 is also high. This relationship applies to the other terminals 22.03–22.06.

The outputs from the terminals 22.02–22.06 are applied in FIG. 23 to the correspondingly numbered terminals together with a Not Start and Branch Stop signals to condition the AI block 23.01 to give a compare signal at terminal 23.02, FIG. 23. The compare signal is then applied in FIG. 19 to set the Progam trigger 19.02 on which in turn sets the Calculate trigger 22.02 on so that the Branch Routine then becomes effective to control the subsequent operations of the system.

RESTORE OPERATION

A number of situations shown in FIG. 18 restore the operator entry devices for operator control. The operator mode is established by a Restore signal from terminal 18.01. One of the ways that this signal is established is by a Calculate, a Branch and a PT8 perforation to the AOI circuit 18.02 during a Branch operation. Therefore, Calculate input together with a Branch instruction "32" in the F1F2 latches, channels 1–5, together with a perforation in channel 8, restores the system. The foregoing arrangement is useful since the system can be searching for a desired Branch Routine in program tape 1 while the numeric keyboard 20 and the alphanumeric keyboard 2 are restored for the operator to enter information. Therefore, the operator can be performing tasks during the time required for location of the Branch Routine in program tape 30.

Normally, the system checks memory 21 for the presence of a Branch Mark upon occurrence of a Branch Instruction. This also takes some time and if a Branch Mark is not present, the perforation in channel 8 of the program tape 30 places the system in a mode ready for the operator to proceed with manual entry or other control, rather than under automatic Branch Routine control.

Under some circumstances, it may also be desirable to use the Restore output to reset the Branch Mark in memory 21 following its recognition and initiation of the Branch Routine indicated. Referring to the previous listings for the Branch Instruction, code "32," the A1 portion of the channels in program tape 30 control various printer opeartions. If a "0" exists in the A1 latches, then no printer function is indicated. The A2 latches control resetting of the Branch Mark and the establishment of a Restore condition in the equipment.

Assume as a typical example that an instruction in program tape 30 instructs the system to type a word or words from memory 21. This instruction may be followed by an A1 instruction with a code of "1" to instruct the system to perform a Carrier Return operation. Following this, the program tape 30 has a Branch Instruction with an A2 code of "4," "5," "6," or "7," indicating a Restore operation. The operator can then enter numeric information or perform other tasks while the Branching takes place. Any of the foregoing Restore codes will have a punch in channel 8 of the tape that is applied as a PT8 signal to the AOI circuit 18.02, FIG. 18.

The Restore signal from terminal 18.01 is applied in FIG. 15 together with a Normally Closed (N/C) condition at terminal 5.17 to set the S5 latch on. The Not Lock Keyboard signal from terminal 10.02 is high and the Lock Keyboard signal at terminal 10.01 is low.

Also, the signal from terminal 18.01 is applied in FIG. 16 and when a compare occurs to set the Program trigger 19.01, the signal at terminal 19.02 conditions the trigger 16.01 off to terminate the skipping of the program tape in readiness to begin the required routine when the operator is ready for it.

Figure 2C:
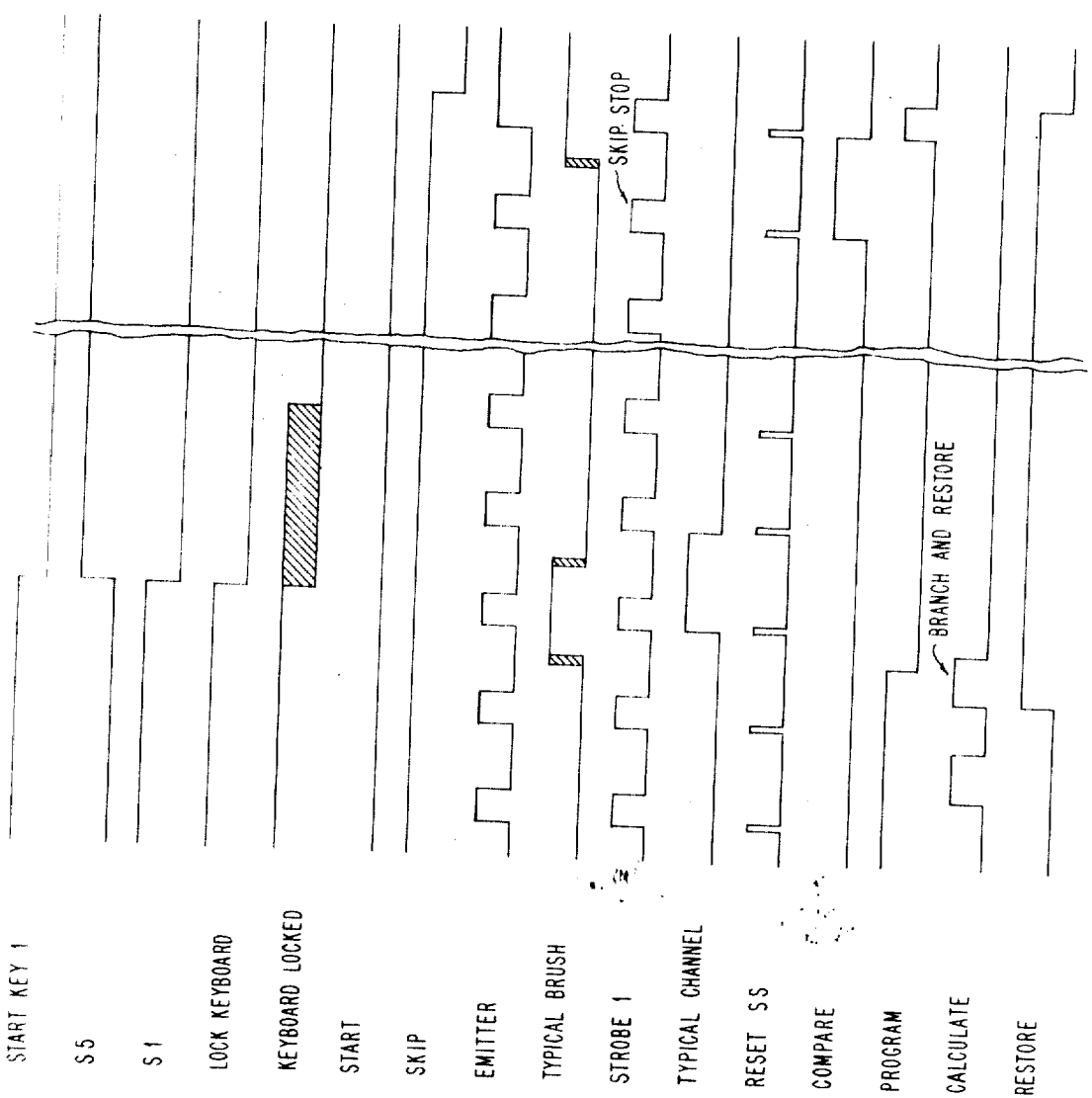

The Branch, Branch Stop and Restore operations are illustrated in FIG. 2b. The Branch and Restore operation is illustrated in FIG. 2c. Following the location of the Branch routine and the completion of entry of information the Start key is again depressed, the keyboard is locked, and the stepping of the program tape proceeds. Assuming Start key S1, FIG. 5, is depressed, the establishment of the S1 signal at terminal 15.01, FIG. 15, inhibits the S5 signal at 15.09 and establishes the Not S5 signal at terminal 15.10. The emitter signal from terminal 12.02, FIG. 12, together with the Skip signal at terminal 16.10 and the Not Calculate signal at terminal 20.06 establishes the strobing action of FIG. 27.

OTHER ASPECTS OF TAPE CONTROLLED PROGRAMMING

Arithmetic operations

As indicated in the tabulation of program instructions, a number of arithmetic functions are provided for including Add, Subtract, Transfer+, Transfer−, Test for Zero Balance, Test for Negative Balance, Multiply, Divide, and Shift. Therefore, the function codes in arithmetic instructions in the program tape 30 can be utilized directly by program control logic 13 for initiating the desired arithmetic operation.

Test Instruction

Besides the normal arithmetic operations involving Add, Subtract, Test for Negative Balance, Test for Zero, etc., a separate Test Instruction is provided in order to determine whether the particular Branch Mark location in memory 21 is set and thereby to determine whether a Branch operation is required at the time of the test. The code for the Test Instruction is "16."

Printer Control

A number of Printer Control instructions designated "Type" are provided for to control printer operations. As noted in the previous tabulation of Instructions, a considerable variety of typing capabilities is possible. When one of the type instructions, "00" to "07" occurs, the data to be printed is accessed at the address in memory 21 indicated in the A1A2 channels of the program tape 30. A number of punctuation alternatives are provided for the B1 channels, while the field width of the printed field is determined by the code in the B2 channels.

Distribution memory

A code "17" instructs the apparatus to consider the code in the B2 channels for distributing data in the system to desired locations in memory 21. A feature of this sort is advantageous when it is desired to maintain a running total of, for example, the sales of individual salesmen, with each salesman being designated by a unique code representation.

Program Entry

When a Program Entry code is recognized in tape 30, comprising the code "23" the apparatus is operative to transfer a digit from either the A1A2 channels or the B1B2 channels in program tape 30 into the "00" location of memory 21. In this fashion, digits stored in the program tape may be entered into the memory 21 as a supplement to the direct entry of numeric factors from the numeric keyboard 20, FIG. 1.

Auto functions

A program code "33" instructs the apparatus to check the A1A2 channels of the program tape 30 to initiate various functions of the printer such as Forms Skip, Tab, Carriage Open, Tab Left, Feed Rolls, Open, etc.

Alpha print

The code "37" controls the system to operate the printer according to designations stored in the program tape 30. As indicated in the instruction tabulation, the A1A2 channels are checked for the desired amount of rotation of the print element in printer 2 while the B1B2 channels are checked for the desired amount of tilt of the print element to effect printing of a desired character on document 1.

While the invention has been shown and described with reference to a preferred embodiment, it will be understood by those skilled in the art that various changes in form and detail may be made without departing from the spirit and scope of the invention.

What is claimed is:
1. Programming apparatus, comprising:
   a printer having facilities for printing an accounting document in predetermined individual field locations;
   primary program means associated with said printer and coordinated with said individual field locations for providing a distinctive coded field manifestation as each said field location on an accounting document is encountered during its preparation;
   an auxiliary program unit independent of said printer, said unit having facilities for reading a program tape record media with a succession of coded representations grouped as primary routines, alternate routines, and subroutines, each of said groups being identified by a unique code to indicate the beginning of the routine;
   means for initiating a search of said auxiliary program tape for a desired routine therein related to a particular field on said document as manifested by said primary program means;
   means controlled by said initiating means for scanning said auxiliary program tape for the desired field routine;
   and comparing means responsive to recognition of coded representations indicative of the desired field routine for terminating said search.
2. The apparatus of claim 1, wherein:
   said primary program means is a vertical tape unit associated with a document to supply indication of fields on said document oriented in a vertical direction.
3. The apparatus of claim 1, wherein:
   said primary program means is a horizontal tape unit that supplies indications of field locations on a document oriented in a horizontal direction.
4. The apparatus of claim 1, wherein:
   said primary program means comprises a horizontal tape unit supplying indications correlated to fields oriented horizontally on a document and a vertical tape unit supplying indications of fields oriented vertically on said document with the combined indications providing a coordinate output manifestation indicative of a particular coordinate location on a document during its preparation.

5. The apparatus of claim 1, wherein:
said auxiliary program tape record media comprises a paper tape arranged in an endless loop form with coded representations manifested by perforations therein.

6. Programming apparatus, comprising:
a printer having facilities for printing an accounting document;
means associated with said printer for providing a coded manifestation as each field location on an accounting document is encountered during its preparation;
an auxiliary program unit, said unit having facilities for reading a program tape record media with a succession of coded representations grouped as primary routines, alternate routines, and subroutines, each of said groups being identified by a unique code to indicate the beginning of the routine;
means for initiating a search of said auxiliary program tape for a desired routine therein related to a particular field on said document;
said initiating means being responsive to a Branch Instruction code in said record media for initiating a search for a desired routine;
means controlled by said initiating means for scanning said program tape for the desired field;
comparing means responsive to recognition of coded representations indicative of the desired field for terminating said search;
said comparing means being responsive to a Branch Stop code in said record media for terminating the search operation.

7. Programming apparatus, comprising:
a printer having facilities for printing an accounting document;
means associated with said printer for providing a coded manifestation as each field location on an accounting document is encountered during its preparation;
an auxiliary program unit, said unit having facilities for reading a program tape record media with a succession of coded representations grouped as primary routines, alternate routines, and subroutines, each of said groups being identified by a unique code to indicate the beginning of the routine;
means for initiating a search of said auxiliary program tape for a desired routine therein related to a particular field on said document;
said initiating means comprising a Start key and associated circuits for locating any of a plurality of routines;
means controlled by said initiating means for scanning said program tape for the desired field;
comparing means responsive to recognition of coded representations indicative of the desired field for terminating said search, the actual routine located in said program tape record media being determined by the field indications supplied by said manifesting means.

8. Programming apparatus, comprising:
a printer having facilities for printing an accounting document;
means associated with said printer for providing a coded manifestation as each field location on an accounting document is encountered during its preparation;
an auxiliary program unit, said unit having facilities for reading a program tape record media with a succession of coded representations grouped as primary routines, alternate routines, and subroutines, each of said groups being identified by a unique code to indicate the beginning of the routine;
means for initiating a search of said auxiliary program tape for a desired routine therein related to a particular field on said document;
said initiating means comprising a plurality of Start keys, each of said Start keys having associated circuitry for designating a particular unique routine in said program tape record media;
means controlled by said initiating means for scanning said program tape for the desired field;
comparing means responsive to recognition of coded representations indicative of the desired field for terminating said search; and wherein
said comparing means being responsive to said Start key circuitry to locate only the unique routine indicated by the Start key depressed.

9. Programming apparatus, comprising:
a printer having facilities for printing an accounting document;
means associated with said printer for providing a coded manifestation as each field location on an accounting document is encountered during its preparation;
an auxiliary program unit, said unit having facilities for reading a program tape record media with a succession of coded representations grouped as primary routines, alternate routines and subroutines each of said groups being identified by a unique code to indicate the beginning of the routine;
means for initiating a search of said auxiliary program tape for a desired routine therein related to a particular field on said document;
means controlled by said initiating means for scanning said program tape for the desired field;
comparing means responsive to recognition of coded representations indicative of the desired field for terminating said search;
a memory unit for storing numeric factors and Branch Mark indications;
means for entering Branch Mark indications in said memory unit indicative of desired program routines in said program tape record media;
means responsive to a Branch code in said program tape record media for testing the Branch Mark location in said memory unit to determine if the routine is to be initiated;
means operative when a Branch operation is required for thereafter initiating a Branch search in said program tape record media;
and means associated with said comparing means for terminating the Branch operation when a Branch Stop code is encountered in said record media.

10. The apparatus of claim 9, further comprising:
operator oriented key entry means for entering Branch Mark indications in said memory unit.

11. The apparatus of claim 9, further comprising:
operator oriented key entry means for entering numeric factors in said memory unit.

12. Programming apparatus, comprising:
a printer having facilities for printing an accounting document;
means associated with said printer for providing a coded manifestation as each field location on an accounting document is encountered during its preparation;
an auxiliary program unit, said unit having facilities for reading a program tape record media with a succession of coded representations grouped as primary routines, alternate routines, and subroutines, each of said groups being identified by a unique code to indicate the beginning of the routine;
means for initiating a search of said auxiliary program tape for a desired routine therein related to a particular field on said document;
means controlled by said initiating means for scanning said program tape for the desired field;
comparing means responsive to recognition of coded representations indicative of the desired field for terminating said search;
a memory unit for storing data manifestations;
means for performing arithmetic operations;
means controlled by said comparing means upon termination of a search operation for establishing a program routine in accordance with the coded representations of the routine located in said program tape record media;

and means controlled by said program means for operating said arithmetic means as required.

13. The apparatus of claim 12, wherein:

reading of coded representations in said program tape record media and performance of program routines based on the codes recognized takes place continuously and concurrently.

14. The apparatus of claim 13, further comprising:

means responsive to an operation specified by the coded representations in said program tape record media that involves a time interval longer than the time interval between successive coded representations in said program tape record media for inhibiting the further scanning of said program tape record media until said operation is completed.

15. The apparatus of claim 14, wherein:

said operations comprise printer operations such as Carrier Return or Tab, as well as long calculation operations such as Multiply.

16. The apparatus of claim 1, wherein:

said program tape record media comprises a plurality of code channels grouped to accommodate function codes, A word address codes, B word address codes, and a parity code.

17. Programming apparatus, comprising:

a printer having facilities for printing an accounting document;

means associated with said printer for providing a coded manifestation as each field location on an accounting document is encountered during its preparation, said manifesting means comprising a horizontal tape unit oriented to the horizontal fields on a document and a vertical tape unit oriented to the vertical fields on a document;

an auxiliary program unit, said unit having facilities for reading a program tape record media with a succession of coded representations grouped as primary routines, alternate routines, and subroutines, each of said groups being identified by a unique code to indicate the beginning of the routine, said program tape record media comprising a plurality of code channels grouped to accommodate function codes, A word address codes, B word address codes, and a parity code;

means for initiating a search of said auxiliary program tape for a desired routine therein related to a particular field on said document;

means controlled by said initiating means for scanning said program tape for the desired field;

and comparing means for comparing horizontal and vertical manifestations directly with the A word and B word coded representations in said program tape record media during a search operation, and responsive to recognition of coded representations indicative of the desired field for terminating said search.

18. Programming apparatus, comprising:

a printer having facilities for printing an accounting document;

means associated with said printer for providing a coded manifestation as each field location on an accounting document is encountered during its preparation;

an auxiliary program unit, said unit having facilities for reading a program tape record media with a succession of coded representations grouped as primary routines, alternate routines, and subroutines, each of said groups being identified by a unique code to indicate the beginning of the routine, said program tape record media comprises a plurality of code channels grouped to accommodate function codes, A word address codes, B word address codes, and a parity code;

means for initiating a search of said auxiliary program tape for a desired routine therein related to a particular field on said document, said initiating means including means responsive to recognition of a Branch Instruction in said program record media for initiating a search for a desired routine in said record media with the desired routine being indicated by a B word code in the Branch Instruction;

means controlled by said initiating means for scanning said program tape for the desired field;

means for storing the B word address of the desired routine;

and comparing means responsive to the B word code stored in said storing means and to a corresponding A word code in a Branch Stop Instruction in said program tape record media to terminate the search operation.

19. Programming apparatus, comprising:

a printer having facilities for printing an accounting document; means associated with said printer for providing a coded manifestation as each field location on an accounting document is encountered during its preparation;

an auxiliary program unit, said unit having facilities for reading a program tape record media with a succession of coded representations grouped as primary routines, alternate routitnes, and subroutines, each of said groups being identified by a unique code to indicate the beginning of the routine;

means for initiating a search of said auxiliary program tape for a desired routine therein related to a particular field on said document, said initiating means being responsive to a Branch and Restore Instruction code in said program tape record media to initiate a search for a desired routine in said record media;

means controlled by said initiating means for scanning said program tape for the desired field;

comparing means responsive to recognition of coded representations indicative of the desired field for terminating said search;

operator oriented means for entering data into said apparatus and for performing other operations such as printing;

and restoring means responsive to said Branch and Restore code recognition to restore said operator entry means to enable their operation concurrently with the Search for the routine required in said record media.

20. The apparatus of claim 19, wherein:

said restoring means is responsive to a Restore code in said program tape to restore said operator entry means immediately without initiation of a Branch operation.

21. The apparatus of claim 9, wherein:

said initiating means is responsive to any of a plurality of different Branch code instructions to initiate a test for a Branch Mark in said memory unit; and wherein, means are provided responsive to selected ones of said Branch code instructions to reset any Branch Mark location in said memory unit following its recognition by said apparatus.

22. Programming apparatus, comprising:

a printer having facilities for printing providing a coded manifestation as each field location on an accounting document is encountered during its preparation;

an auxiliary program unit, said unit having facilities for reading a program tape record media with a succession of coded representations grouped as primary routines, alternate routines, and subroutines, each of said groups being identified by a unique code to indicate the beginning of the routine, said program tape record media comprising a plurality of code channels grouped to accommodate function codes, A word address codes, B word address codes, and a parity code;

means for initiating a search of said auxiliary program tape for a desired routine therein related to a particular field on said document;

means controlled by said initiating means for scanning said program tape for the desired field;

comparing means responsive to recognition of coded representations indicative of the desired field for terminating said search;

program control means responsive to function codes stored in said program tape record media to operate said printer in a desired manner for printing on a document;

said A word portion of a printer instruction selecting a word for printing; and said B word portion of said program tape record media selecting the punctuation and field width required during printing.

23. Programming apparatus, comprising:

a printer having facilities for printing an accounting document;

means associated with said printer for providing a coded manifestation as each field location on an accounting document is encountered during its preparation;

an auxiliary program unit, said unit having facilities for reading a program tape record media with a succession of coded representations grouped as primary routines, alternate routines, and subroutines, each of said groups being identified by a unique code to indicate the beginning of the routine, said program tape record media comprising a plurality of code channels grouped to accommodate function codes, A word address codes, B word address codes, and a parity code;

an Auto Function code in said program tape record media initiating control of said printer to Tab, Index, Forms Skip, Tab, Open Carriage, Open Feed rolls, and related functions, according to the coded representation stored in the A word portion of the Auto Function code;

means for initiating a search of said auxiliary program tape for a desired routine therein related to a particular field on said document;

means controlled by said initiating means for scanning said program tape for the desired field;

and comparing means responsive to recognition of coded representations indicative of the desired field for terminating said search.

24. The apparatus of claim 1, wherein:

said printer comprises a single element print head moved adjacent a document during printing and rotated and tilted for print selection prior to printing during successive cycles; and wherein.

an Alpha Print code is provided for said program tape record media to control the print selection of said print head for printing a character as required directly from said program tape record media.

25. Programming apparatus, comprising:

a printer having facilities for printing an accounting document;

means associated with said printer for providing a coded manifestation as each field location on an accounting document is encountered during its preparation;

an auxiliary program unit, said unit having facilities for reading a program tape record media with a succession of coded representations grouped as primary routines, alternate routines, and subroutines, each of said groups being identified by a unique code to indicate the beginning of the routine, said program tape record media comprising a plurality of code channels grouped to accommodate function codes, A word address codes, B word address codes, a parity code, and a Distribution Memory code;

means for initiating a search of said auxiliary program tape for a desired routine therein related to a particular field on said document;

means controlled by said initiating means for scanning said program tape for the desired field;

comparing means responsive to recognition of coded representations in indicative of the desired field for terminating said search;

a memory unit for storing data in discrete memory locations;

and means responsive to said Distribution Memory code to transfer data into a selected discrete memory location.

26. Programming apparatus, comprising:

a printer having facilities for printing an accounting document;

means associated with said printer for providing a coded manifestation as each field location on an accounting document is encountered during its preparation;

an auxiliary program unit, said unit having facilities for reading a program tape record media with a succession of coded representations grouped as primary routines, alternate routines, and subroutines, each of said groups being identified by a unique code to indicate the beginning of the routine, said program tape record media comprising a plurality of code channels grouped to accommodate function codes, A word address codes, B word address codes, a parity code, and a Program Entry code;

means for initiating a search of said auxiliary program tape for a desired routine therein related to a particular field on said document;

means controlled by said initiating means for scanning said program tape for the desired field;

comparing means responsive to recognition of coded representations indicative of the desired field for terminating said search;

a memory means for storing data manifestations in discrete locations;

and means responsive to said Program Entry code for transferring digital values stored in an A word portion of a B word portion of said program tape record media into a selected discrete location in said memory means.

27. The apparatus of claim 12, wherein:

said Calculating operations include the arithmetic processes of Add, Substract, Transfer+, Transfer—, Test for Negative Balance, Test for Zero Balance, Multiply, Divide, and Shift.

References Cited

UNITED STATES PATENTS

| 3,353,163 | 11/1967 | Soule et al. | 340—172.5 |
| 3,291,277 | 12/1966 | Borrelli et al. | 197—20 |
| 3,283,871 | 11/1966 | Becking et al. | 197—20 |
| 3,274,564 | 9/1966 | Binder et al. | 340—172.5 |
| 3,197,618 | 7/1965 | Stanley et al. | 235—61.6 |
| 3,138,702 | 6/1964 | Heming et al. | 235—157 |
| 3,105,636 | 10/1963 | Greene | 235—60.25 |
| 3,096,508 | 7/1963 | Reitfort | 340—172.5 |

GARETH D. SHAW, *Primary Examiner.*

U.S. Cl. X.R.

197—1, 20; 235—61.6